United States Patent
Uemura et al.

(10) Patent No.: US 9,820,278 B2
(45) Date of Patent: Nov. 14, 2017

(54) TERMINAL APPARATUS, BASE STATION APPARATUS, COMMUNICATION SYSTEM, COMMUNICATION METHOD AND INTEGRATED CIRCUIT

(71) Applicant: Sharp Kabushiki Kaisha, Osaka-shi, Osaka (JP)

(72) Inventors: Katsunari Uemura, Osaka (JP); Yasuyuki Kato, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 48 days.

(21) Appl. No.: 14/775,894

(22) PCT Filed: Mar. 5, 2014

(86) PCT No.: PCT/JP2014/055615
§ 371 (c)(1),
(2) Date: Sep. 14, 2015

(87) PCT Pub. No.: WO2014/141965
PCT Pub. Date: Sep. 18, 2014

(65) Prior Publication Data
US 2016/0029387 A1    Jan. 28, 2016

(30) Foreign Application Priority Data
Mar. 14, 2013    (JP) .................................. 2013-051400

(51) Int. Cl.
*H04W 72/04*    (2009.01)
*H04W 16/32*    (2009.01)
(Continued)

(52) U.S. Cl.
CPC ....... *H04W 72/0453* (2013.01); *H04W 16/32* (2013.01); *H04W 48/18* (2013.01);
(Continued)

(58) Field of Classification Search
None
See application file for complete search history.

(56) References Cited

U.S. PATENT DOCUMENTS 8,559,405 B2 * 10/2013 Dinan ............... H04W 56/0005
                                                         370/329
8,917,605 B2 * 12/2014 Pelletier .............. H04W 52/365
                                                         370/236
(Continued)

FOREIGN PATENT DOCUMENTS

EP    2 230 875 A2    9/2010
EP    2 552 170 A1    1/2013
KR    WO 2014109568 A1 *    7/2014    ........... H04L 1/1812

OTHER PUBLICATIONS

NTT Docomo, Inc., "Deployment scenarios and design goals for dual connectivity", 3GPP TSG-RAN WG2 #81, R2-130444, Jan. 28-Feb. 1, 2013, pp. 1-6.
(Continued)

*Primary Examiner* — Hassan Phillips
*Assistant Examiner* — Ayanah George
(74) *Attorney, Agent, or Firm* — Keating & Bennett, LLP

(57) ABSTRACT

Provided are techniques related to a terminal apparatus, a base station apparatus, a communication system, a communication method and an integrated circuit that realize efficient procedure of transmitting uplink control information in a plurality of cells. The terminal apparatus groups a plurality of cells into a single primary cell group and one or more secondary cell groups, and, in the case of performing a radio resource request, carries out either a radio resource request with respect to a cell of the primary cell group or a radio resource request with respect to a cell of the secondary cell groups.

7 Claims, 10 Drawing Sheets

(51) Int. Cl.
    *H04W 48/18*     (2009.01)
    *H04W 74/00*     (2009.01)
    *H04W 84/04*     (2009.01)

(52) U.S. Cl.
    CPC ....... *H04W 72/0406* (2013.01); *H04W 74/00* (2013.01); *H04W 84/045* (2013.01)

(56) References Cited

U.S. PATENT DOCUMENTS

| | | | |
|---|---|---|---|
| 2011/0182200 A1* | 7/2011 | Wan | H04W 72/1289 370/252 |
| 2013/0114483 A1* | 5/2013 | Suzuki | H04W 76/048 370/311 |
| 2013/0114573 A1* | 5/2013 | Suzuki | H04L 1/1887 370/336 |
| 2013/0157669 A1* | 6/2013 | Turtinen | H04W 48/12 455/450 |
| 2013/0316721 A1* | 11/2013 | Lan | H04W 72/0426 455/452.1 |
| 2014/0056243 A1* | 2/2014 | Pelletier | H04W 74/04 370/329 |

OTHER PUBLICATIONS

Nokia Corporation et al., "New WI: Further LTE Carrier Aggregation Enhancements—Core Part", 3GPP TSG RAN meeting #59, RP-130380, Feb. 26-Mar. 1, 2013, 7 pages.

\* cited by examiner

TERMINAL APPARATUS, BASE STATION APPARATUS, COMMUNICATION SYSTEM, COMMUNICATION METHOD AND INTEGRATED CIRCUIT

TECHNICAL FIELD

Embodiments of the present invention relate to techniques of a terminal apparatus, a base station apparatus, a communication system, a communication method and an integrated circuit that realize efficient procedure of transmitting uplink control information in a plurality of cells.

The present application claims priority based on Japanese Patent Application No. 2013-051400 filed in Japan on Mar. 14, 2013, the content of which is incorporated herein by reference.

BACKGROUND ART

In 3GPP (3rd Generation Partnership Project) which is a standardization project, standardization of Evolved Universal Terrestrial Radio Access (hereafter referred to as "EUTRA") is performed in which high speed communication is realized by adopting an OFDM (Orthogonal Frequency-Division Multiplexing) communication scheme and flexible scheduling with a predetermined frequency and time unit called a resource block.

Moreover, in the 3GPP, a discussion on Advanced EUTRA that realizes higher-speed data transmission and has an upward compatibility with the EUTRA has been carried out. In the EUTRA, a communication system is premised to have a network in which base station apparatuses are composed of substantially the same cell configurations (cell sizes), but in the Advanced EUTRA, a discussion has been carried out on a communication system that is premised to have a network (Heterogeneous Network) in which base station apparatuses (cells) having different configurations are mixed in a same area.

In a communication system in which cells (small cells) having a smaller cell radius than a conventional one are deployed like the heterogeneous network, a function of connecting to a base station of a conventional cell having a large radius (macro cell) and a base station of a small cell at the same time (dual connectivity) is being discussed (NPL 1).

For example, when a terminal apparatus tries to realize dual connectivity between a cell (macro cell) having a large cell radius (cell size) and a cell (small cell (or picocell)) having a small cell radius, because of low speed of a backbone line (Backhaul) between the macro cell and the small cell, when the terminal apparatus provides feedback information of the small cell via the macro cell, efficiency of scheduling in the small cell is likely to be reduced due to delay.

Moreover, proposed in NPL 2 is that when a terminal apparatus connects with base station apparatuses of a plurality of cells, plural pieces of uplink control information are exchanged between the terminal apparatus and a base station apparatus by allocating a physical uplink control channel to a plurality of uplinks.

CITATION LIST

Non-Patent Document

NPL 1: R2-130444, NTT DOCOMO, INC., 3GPP TSG RAN2#81, St. Julian's, Malta, Jan. 28th-Feb. 1, 2013. http://www.3gpp.org/ftp/tsg_ran/WG2_RL2/TSGR2_81/Docs/

NPL 2: RP-130380, Nokia Corporation, 3GPP TSG RAN#60, Oranjestad, Aruba, Jun. 11th-14th, 2013. http://www.3gpp.org/ftp/tsg_ran/TSG_RAN/TSGR_59/Docs/

DISCLOSURE OF THE INVENTION

Problems to be Solved by the Invention

With a method for allocating a physical uplink control channel to a plurality of uplinks like NPL 2, it is possible, when a backbone line (Backhaul) between a macro cell and a small cell has a low speed, to provide feedback information directly to the small cell from a terminal apparatus, thus making it possible to solve the problem that scheduling in the small cell is delayed.

However, no discussion has been made before on, when a physical uplink control channel is allocated to a plurality of uplinks, a relation to management of a transmission timing of the uplinks, nor at which cell the physical uplink control channel is to be transmitted to make scheduling efficient. Particularly, no discussion is made on which information is to be based on when the terminal apparatus transmits the physical uplink control channel in a state where the terminal apparatus can use the physical uplink control channel in a plurality of cells, and there is a problem that transmission procedure becomes inefficient.

In view of the aforementioned problem, an object of embodiments of present invention is to provide techniques related to a terminal apparatus, a base station apparatus, a communication system, a communication method and an integrated circuit that realize efficient procedure of transmitting uplink control information in a plurality of cells.

Means for Solving the Problems

In order to achieve the aforementioned object, the following means is taken. That is, a terminal apparatus in an embodiment of the present invention is a terminal apparatus connectable to a plurality of base station apparatuses and is a terminal apparatus in a communication system in which the terminal apparatus and the plurality of base station apparatuses are connected by using a plurality of cells. The terminal apparatus is comprising means that the terminal apparatus is configured to group the plurality of cells into a first cell group including one primary cell and a second cell group not including the primary cell, receive, from the base station apparatus, uplink control channel configuration information used for a radio resource request corresponding to the first cell group and uplink control channel configuration information used for a radio resource request corresponding to the second cell group, transmit an uplink control channel to a cell of the first cell group in a case of performing the radio resource request with respect to the first cell group, and transmit an uplink control channel to a cell of the second cell group in a case of performing the radio resource request with respect to the second cell group.

Moreover, the terminal apparatus in the embodiment of the present invention may include means that the radio resource request for the first cell group or the second cell group is changed to a pending state based on an uplink buffer for each cell group, and the uplink control channel corresponding to the cell group in the pending state is transmitted.

Moreover, the terminal apparatus in the embodiment of the present invention may include means that the maximum number of times of transmission of the uplink control channel is configured to each of the first cell group and the second cell group individually, and the uplink control channel configuration information of the second cell group is released in a case where the number of times of transmission of the uplink control channel for the cell of the second cell group reaches the maximum number of times of transmission.

In this manner, the terminal apparatus is able to make procedure of transmitting uplink control information more efficient by selecting an appropriate transmission processing method for a radio resource request to the base station apparatuses.

Moreover, a base station apparatus in an embodiment of the present invention is a base station apparatus connectable to a terminal apparatus and is a base station apparatus in a communication system in which the terminal apparatus and a plurality of base station apparatuses are connected by using a plurality of cells. The base station apparatus is comprising means that the base station apparatus is configured to transmit, to the terminal apparatus, information for grouping the plurality of cells into a first cell group including one primary cell and a second cell group not including the primary cell, transmit uplink control channel configuration information used for a radio resource request corresponding to the first cell group and uplink control channel configuration information used for a radio resource request corresponding to the second cell group, and cause the terminal apparatus to transmit an uplink control channel to a cell of the first cell group in a case where the radio resource request with respect to the first cell group is performed, and to transmit an uplink control channel to a cell of the second cell group in a case where the radio resource request with respect to the second cell group is performed.

Moreover, the base station apparatus in the embodiment of the present invention may include means that the base station apparatus is configured to notify the terminal apparatus of uplink control channel configuration information, which is configured to the primary cell and one cell in the second cell group, the uplink control channel configuration information is used for the radio resource request.

In this manner, the base station apparatus is able to improve throughput for the terminal apparatus by providing the terminal apparatus with appropriate scheduling using a plurality of cells.

Moreover, a communication system in an embodiment of the present invention is a communication system in which a terminal apparatus and a plurality of base station apparatuses are connectable. The communication system includes means that the base station apparatuses are configured to transmit information for grouping a plurality of cells into a first cell group including one primary cell and a second cell group not including the primary cell, and transmit uplink control channel configuration information used for a radio resource request corresponding to the first cell group and uplink control channel configuration information used for a radio resource request corresponding to the second cell group, and that the terminal apparatus is configured to receive the uplink control channel configuration information used for the radio resource request corresponding to the first cell group and the uplink control channel configuration information used for a radio resource request corresponding to the second cell group, and transmit an uplink control channel to a cell of the first cell group in a case of performing the radio resource request with respect to the first cell group, and transmit an uplink control channel to a cell of the second cell group in a case of performing the radio resource request with respect to the second cell group.

In this manner, the terminal apparatus of the communication system is able to make procedure of transmitting uplink control information more efficient by selecting an appropriate transmission processing method for a radio resource request to the base station apparatus, and the base station apparatuses of the communication system are able to improve throughput for the terminal apparatus by providing the terminal apparatus with appropriate scheduling using a plurality of cells.

Moreover, a communication method in an embodiment of the present invention is a communication method of a terminal apparatus connectable to a plurality of base station apparatuses and is a communication method of the terminal apparatus in a communication system in which the terminal apparatus and the plurality of base station apparatuses are connected by using a plurality of cells. The communication method includes at least a step of grouping the plurality of cells into a first cell group including one primary cell and a second cell group not including the primary cell, a step of receiving, from the base station apparatuses, uplink control channel configuration information used for a radio resource request corresponding to the first cell group and uplink control channel configuration information used for a radio resource request corresponding to the second cell group, and a step of transmitting an uplink control channel to a cell of the first cell group in a case of performing the radio resource request with respect to the first cell group, and transmitting an uplink control channel to a cell of the second cell group in a case of performing the radio resource request with respect to the second cell group.

In this manner, the communication method of the terminal apparatus is able to make procedure of transmitting uplink control information more efficient by selecting an appropriate transmission processing method for a radio resource request to the base station apparatus.

Moreover, a communication method in an embodiment of the present invention is a communication method of a base station apparatus connectable to a terminal apparatus and is a communication method of the base station apparatus in a communication system in which the terminal apparatus and a plurality of base station apparatuses are connected by using a plurality of cells. The communication method includes at least a step of transmitting, to the terminal apparatus, information for grouping the plurality of cells into a first cell group including one primary cell and a second cell group not including the primary cell, a step of transmitting uplink control channel configuration information used for a radio resource request corresponding to the first cell group and uplink control channel configuration information used for a radio resource request corresponding to the second cell group, and a step of causing the terminal apparatus to transmit an uplink control channel to a cell of the first cell group, in a case where the radio resource request with respect to the first cell group is performed, and to transmit an uplink control channel to a cell of the second cell group in a case where the radio resource request with respect to the second cell group is performed.

In this manner, the communication method of the base station apparatus is able to improve throughput for the terminal apparatus by providing the terminal apparatus with appropriate scheduling using a plurality of cells.

Moreover, an integrated circuit in an embodiment of the present invention is an integrated circuit mountable in a terminal apparatus connected to a plurality of base station apparatuses and is an integrated circuit of the terminal apparatus in a communication system in which the terminal apparatus and the plurality of base station apparatuses are connected by using a plurality of cells. The integrated circuit includes a series of functions including a function of grouping the plurality of cells into a first cell group including one primary cell and a second cell group not including the primary cell, a function of receiving, from the base station apparatuses, uplink control channel configuration information used for a radio resource request corresponding to the first cell group and uplink control channel configuration information used for a radio resource request corresponding to the second cell group, and a function of transmitting an uplink control channel to a cell of the first cell group in a case of performing the radio resource request with respect to the first cell group, and a function of transmitting an uplink control channel to a cell of the second cell group in a case of performing the radio resource request with respect to the second cell group.

In this manner, the integrated circuit of the terminal apparatus is able to make procedure of transmitting uplink control information more efficient by selecting an appropriate transmission processing method for a radio resource request to the base station apparatuses.

Moreover, an integrated circuit in an embodiment of the present invention is an integrated circuit of a base station apparatus connectable to a terminal apparatus and is an integrated circuit of the base station apparatus in a communication system in which the terminal apparatus and a plurality of base station apparatuses are connected by using a plurality of cells. The integrated circuit includes a series of functions including a function of transmitting, to the terminal apparatus, information for grouping the plurality of cells into a first cell group including one primary cell and a second cell group not including the primary cell, a function of transmitting uplink control channel configuration information used for a radio resource request corresponding to the first cell group and uplink control channel configuration information used for a radio resource request corresponding to the second cell group, and a function of causing the terminal apparatus to transmit an uplink control channel to a cell of the first cell group in a case where the radio resource request with respect to the first cell group is performed, and to transmit an uplink control channel to a cell of the second cell group in a case where the radio resource request with respect to the second cell group is performed.

In this manner, the integrated circuit of the base station apparatus is able to improve throughput for the terminal apparatus by providing the terminal apparatus with appropriate scheduling using a plurality of cells.

In this specification, although each embodiment is disclosed in terms of techniques related to a terminal apparatus, a base station apparatus, a communication system, a communication method and an integrated circuit realizing efficient procedure of transmitting uplink control information in a plurality of cells, a communication scheme which is able to be applied to each embodiment is not limited to EUTRA or a communication scheme such as Advanced EUTRA having upward compatibility with EUTRA.

For example, the techniques described in this specification may be used in various communication systems using code division multiple access (CDMA), time division multiple access (TDMA), frequency division multiple access (FDMA), orthogonal FDMA (OFDMA), single carrier FDMA (SC-FDMA), other access scheme, and the like. In addition, in this specification, a system and a network may be used synonymously.

Moreover, a technique of aggregating frequencies (component carriers or frequency bands) of a plurality of different frequency bands and dealing with them as one frequency (frequency band) by carrier aggregation may apply to the terminal apparatus and the base station apparatus. The component carriers include an uplink component carrier coping with uplink and a downlink component carrier coping with downlink. In this specification, a frequency and a frequency band may be used synonymously.

For example, when five component carriers each having a frequency bandwidth of 20 MHz are aggregated by the carrier aggregation, a terminal apparatus having capability capable of the carrier aggregation performs transmission and reception by regarding the aggregated component carriers to have a frequency bandwidth of 100 MHz. Note that, the component carriers which are aggregated may be contiguous frequencies or frequencies the entire or a part of which are not contiguous. For example, when available frequency bands are an 800 MHz band, a 2 GHz band, and a 3.5 GHz band, a certain component carrier may be transmitted in the 800 MHz band, another component carrier may be transmitted in the 2 GHz band, and still another component carrier may be transmitted in the 3.5 GHz band.

Moreover, it is also possible to aggregate a plurality of contiguous or non-contiguous component carriers in a same frequency band. The frequency bandwidth of each component carrier may be a frequency bandwidth (for example, 5 MHz or 10 MHz) narrower than a receivable frequency bandwidth (for example, 20 MHz) of the terminal apparatus, and respective frequency bandwidths for aggregation may be different from each other. It is desired that the frequency bandwidth be equal to any conventional frequency bandwidth of a cell by considering backward compatibility, but the frequency bandwidth may be different. Further, a component carrier (carrier type) having no backward compatibility may be used. Note that, the number of uplink component carriers allocated (configured, added) to the terminal apparatus by the base station apparatus is desired to be same as or less than the number of downlink component carriers.

A cell that is constituted by the uplink component carrier in which a configuration of an uplink control channel for a radio resource request is performed and the downlink component carrier that is connected to this uplink component carrier in a cell-specific manner is referred to as a primary cell (PCell). In addition, a cell that is constituted by a component carrier other than the primary cell is referred to as a secondary cell (SCell). The terminal apparatus performs reception of a paging message, detection of broadcast information updating, initial access procedure, a configuration of security information and the like in the primary cell, but those may not be performed in the secondary cell.

The primary cell is not subjected to control of activation or deactivation (that is, regarded to be activated at all times), but the secondary cell has activation and deactivation states, and change between those states is explicitly specified by the base station apparatus, and, in addition, the states are changed based on a timer which is configured to the terminal apparatus for each component carrier. The primary cell and the secondary cell are collectively referred to as serving cells.

Effects of the Invention

According to the embodiments of the present invention, it is possible to provide techniques related to a terminal apparatus, a base station apparatus, a communication system, a communication method and an integrated circuit that take efficient procedure of transmitting uplink control information to thereby improve throughput.

MODE FOR CARRYING OUT THE INVENTION

Figure 1:
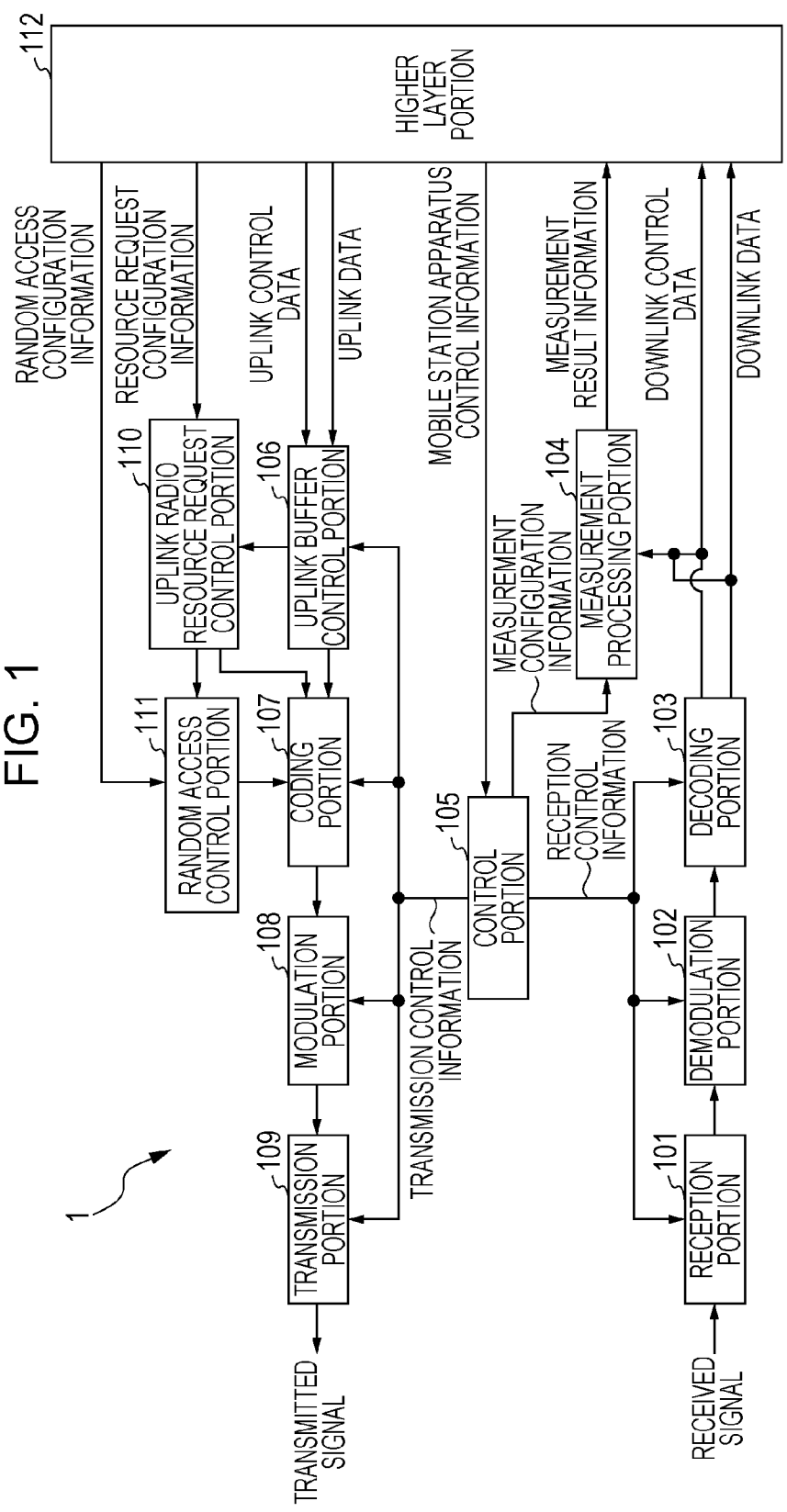
FIG. 1 is a block diagram illustrating one example of a schematic configuration of a terminal apparatus according to an embodiment of the present invention.

A technology related to each embodiment of the present invention will be described below.

[Physical Channel/Physical Signal]

Description will be given for a main physical channel and physical signal which are used in EUTRA and Advanced EUTRA. A channel means a medium used for signal transmission, and a physical channel means a physical medium used for signal transmission. In the present invention, a physical channel and a signal may be used synonymously. There is a possibility that in the EUTRA and the Advanced EUTRA, the physical channel is added or a structure or a format style thereof is changed or added in the future, but, even in the case of modification or addition, there is no influence on description of each embodiment of the present invention.

In the EUTRA and the Advanced EUTRA, scheduling of the physical channel or the physical signal is managed by using a radio frame. One radio frame is 10 ms and one radio frame consists of ten subframes. Further, one subframe is configured by two slots (that is, one subframe has 1 ms and one slot has 0.5 ms). Moreover, management is performed by using a resource block as a minimum unit of scheduling, in which physical channels are arranged. The resource block is defined as a fixed frequency domain in which a frequency axis is configured by an assembly of a plurality of subcarriers (for example, twelve subcarriers) and a region configured by a fixed transmission time interval (one slot).

Synchronization signals are configured by three types of primary synchronization signals and secondary synchronization signals which are configured by 31 types of codes which are arranged alternately in a frequency domain, and a combination of signals of the primary synchronization signals and the secondary synchronization signals indicates 504 cell identifiers (physical cell ID (Physical Cell Identity; PCI)) that identify a base station apparatus and a frame timing for radio synchronization. A terminal apparatus specifies a cell ID of synchronization signals received by cell search.

A physical broadcast channel (PBCH) is transmitted for the purpose of notifying (configuring) a control parameter (broadcast information (system information)) which is commonly used in terminal apparatuses in a cell. Regarding broadcast information which is not notified by the physical broadcast channel, a radio resource whose broadcast information is transmitted by a physical downlink control channel is notified to the terminal apparatus in a cell, and in the notified radio resource, a layer 3 message (system information) for notifying the broadcast information is transmitted by a physical downlink shared channel.

As the broadcast information, a cell global identifier (CGI) indicating an identifier of an individual cell, a tracking area identifier (TAI) for managing a standby area by paging, random access configuration information (such as a transmission timing timer), shared radio resource configuration information in the cell, neighboring cell information, uplink access limit information or the like is notified.

Downlink reference signals are classified into a plurality of types depending on intended use thereof. For example, cell-specific RSs (cell-specific reference signals) are pilot signals which are transmitted with predetermined power for each cell, and are downlink reference signals which are iterated periodically in a frequency domain and a time domain based on a predetermined rule. The terminal apparatus measures reception quality for each cell by receiving the cell-specific RSs. Moreover, the terminal apparatus uses the downlink cell-specific RSs also as reference signals for demodulation of the physical downlink control channel or the physical downlink shared channel that is transmitted at the same time with the cell-specific RSs. As a sequence used for the cell-specific RSs, a sequence which is identifiable for each cell is used.

Further, the downlink reference signals are used also for estimation of channel fluctuation of the downlink. The downlink reference signals used for estimation of channel fluctuation is referred to as channel state information reference signals (CSI-RSs). Moreover, the downlink reference signals which are configured individually to the terminal apparatus is referred to as UE specific reference signals (URSs) or dedicated RSs (DRSs), and referred to for channel compensation processing of a channel when the physical downlink control channel or the physical downlink shared channel is demodulated.

The physical downlink control channel (PDCCH) is transmitted in several OFDM symbols (for example, 1 to 4 OFDM symbols) from beginning of each subframe. An enhanced physical downlink control channel (EPDCCH) is a physical downlink control channel which is arranged in an OFDM symbol in which the physical downlink shared channel PDSCH is arranged. The PDCCH or the EPDCCH is used for the purpose of notifying information for giving instruction of radio resource allocation information in accordance with scheduling of a base station apparatus and an adjustment amount of increase and decrease in transmission power to the terminal apparatus. Hereinafter, when simply described as the physical downlink control channel (PDCCH), it means both physical channels of the PDCCH and the EPDCCH unless otherwise specified.

The terminal apparatus needs to acquire radio resource allocation information called uplink grant in the case of transmission and downlink grant (downlink assignment) in the case of reception from the physical downlink control channel by monitoring the physical downlink control channel addressed to the terminal apparatus itself before transmitting or receiving a layer 3 message (paging, hand-over command, and the like) that is downlink data or downlink control data, and by receiving the physical downlink control channel addressed to the terminal apparatus. Note that, the physical downlink control channel is also able to be configured so as to be, other than to be transmitted in the OFDM symbols described above, transmitted in a domain of a resource block allocated from the base station apparatus to the terminal apparatus in an individual (dedicated) manner.

A physical uplink control channel (PUCCH) is used for performing a reception confirmation response (ACK/NACK; Acknowledgement/Negative Acknowledgement) of data transmitted on the physical downlink shared channel, channel (channel state) information (CSI; Channel State Information) of the downlink, and a radio resource allocation request (radio resource request, scheduling request (SR)) of the uplink.

CSI includes CQI (Channel Quality Indicator), PMI (Precoding Matrix Indicator), PTI (Precoding Type Indicator), and RI (Rank Indicator). Each indicator is represented as indication in some cases, but intended use and meaning thereof are same.

The physical downlink shared channel (PDSCH) is used also for notifying the terminal apparatus of broadcast information (system information) which is not notified by paging or the physical broadcast channel in addition to downlink data as the layer 3 message. Radio resource allocation information of the physical downlink shared channel is indicated by the physical downlink control channel. The physical downlink shared channel is arranged and transmitted in the OFDM symbol other than the OFDM symbol in which the physical downlink control channel is transmitted. That is, the physical downlink shared channel and the physical downlink control channel are subjected to time division multiplexing in one subframe.

A physical uplink shared channel (PUSCH) mainly transmits uplink data and uplink control data, and is also able to include reception quality of the downlink and control data such as ACK/NACK. Moreover, it is used for notifying the base station apparatus of uplink control information in addition to the uplink data as the layer 3 message from the terminal apparatus. Further, in the same manner as the case of the downlink, radio resource allocation information of the physical uplink shared channel is indicated on the physical downlink control channel.

An uplink reference signal (also referred to as an uplink pilot signal or an uplink pilot channel) includes a demodulation reference signal (DMRS) which is used by the base station apparatus for demodulating the physical uplink control channel PUCCH and/or the physical uplink shared channel PUSCH, and a sounding reference signal (SRS) which is used by the base station apparatus mainly for estimating a channel state of the uplink. Moreover, as the sounding reference signal, there are a periodic sounding reference signal (Periodic SRS) which is transmitted periodically and an aperiodic sounding reference signal (Aperiodic SRS) which is transmitted when an instruction is given from the base station apparatus.

A physical random access channel (PRACH) is a channel which is used for notifying (configuring) a preamble sequence and has a guard time. The preamble sequence is configured so as to notify the base station apparatus of information by a plurality of sequences. For example, when sixty four types of sequences are prepared, it is possible to indicate 6-bit information to the base station apparatus. The physical random access channel is used as access means to the base station apparatus from the terminal apparatus.

The terminal apparatus uses the physical random access channel for making a radio resource request of the uplink when the physical uplink control channel is not configured, requesting transmission timing adjustment information (also called timing advance (TA)) which is required for aligning an uplink transmission timing to a reception timing window of the base station apparatus to the base station apparatus, or the like. Moreover, the base station apparatus is able to request the terminal apparatus to start random access procedure by using the physical downlink control channel.

Specifically, the terminal apparatus transmits the preamble sequence by using the radio resource for the physical random access channel that is configured by the base station apparatus. The terminal apparatus which has received the transmission timing adjustment information configures a transmission timing timer (TA timer) for counting an available time of the transmission timing adjustment information which is configured commonly by broadcast information (or configured individually by the layer 3 message) to manage an uplink state of a cell (cell group) as a transmission timing adjusted state during an available time of the transmission timing timer (during counting) and as a transmission timing non-adjusted state (transmission timing un-adjusted state) other than the available period (during stopping).

The layer 3 message is a message handled by a protocol of a control-plane (CP (C-Plane)) which is exchanged between RRC (radio resource control) layers of the terminal apparatus and the base station apparatus, and may be used synonymously with RRC signaling or an RRC message. Note that, against the control-plane, a protocol handling user data is referred to as a user-plane (UP (U-Plane)). Note that, since physical channels other than above are not concerned with each embodiment of the present invention, detailed description thereof will be omitted.

[Radio Network]

A communication available range (communication area) of each frequency which is controlled by the base station apparatus is regarded as a cell. In this case, respective communication areas covered by the base station apparatus may have different areas and different shapes for each frequency. Moreover, areas which are covered may be different for each frequency. A radio network in which cells which are different in types of base station apparatuses and sizes of cell radii are mixed in a same frequency to form one communication system is referred to as a heterogeneous network.

The terminal apparatus operates by regarding inside of a cell as a communication area. When the terminal apparatus moves from a certain cell to another cell, the movement is performed to another suitable cell with cell re-selection procedure at the time of non-radio connection (not under communication) or with handover procedure at the time of radio connection (under communication). The suitable cell is generally a cell which is judged, based on information specified from the base station apparatus, that access of the terminal apparatus is not prohibited, and indicates a cell in which reception quality of the downlink fulfills a predetermined condition.

Note that, the carrier aggregation is communication with a plurality of cells by using a plurality of component carriers (frequency bands), and is also referred to as cell aggregation. Note that, the terminal apparatus may be radio-connected to the base station apparatus through a relay station apparatus (or repeater) for each frequency. That is, the base station apparatus of the each embodiment of the present invention is able to be substituted with a relay station apparatus.

The base station apparatus manages a cell which is an area in which the terminal apparatus is able to communicate in the base station apparatus for each frequency. One base station apparatus may manage a plurality of cells. A cell is classified into a plurality of types according to a size of an area (cell size) in which communication is allowed with the terminal apparatus. For example, a cell is classified into a macro cell and a small cell. Further, the small cell is classified into a femto cell, a picocell and a nano cell according to a size of an area of the cell. Further, when the terminal apparatus is able to communicate with the base station apparatus, a cell which is configured so as to be used for communication with the terminal apparatus is a serving cell and other cell which is not used for communication is referred to as a neighboring cell among cells of the base station apparatus.

[Dual Connectivity]

Figure 9:
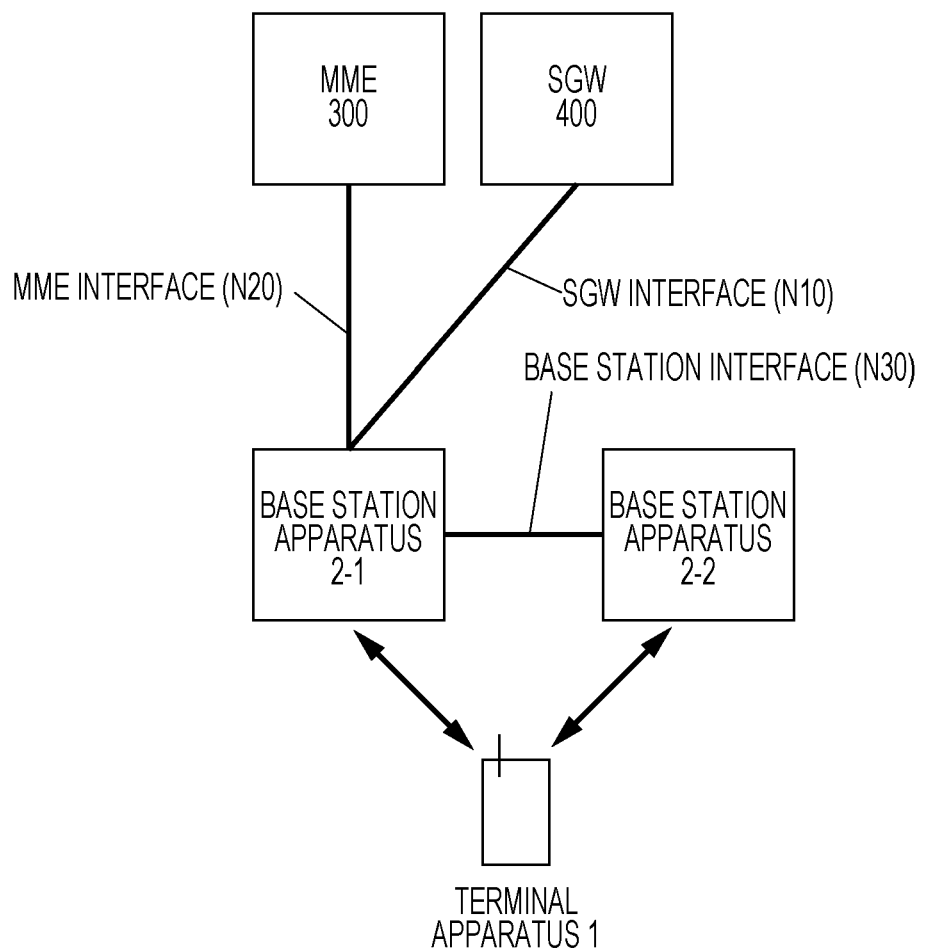
FIG. 9 is a diagram illustrating one example of an architecture of dual connectivity according to an embodiment of the present invention.
Figure 10:
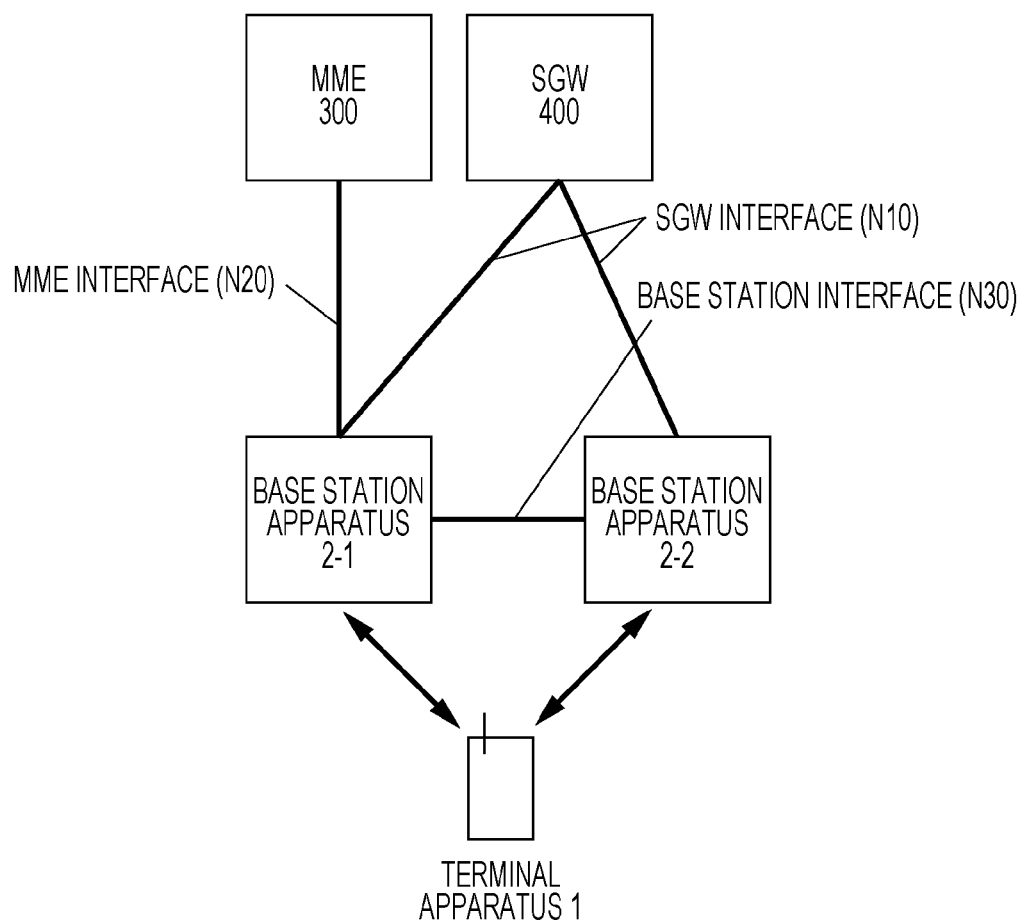
FIG. 10 is a diagram illustrating another example of the architecture of dual connectivity according to an embodiment of the present invention.

Referring to FIG. 9 and FIG. 10, a basic structure (architecture) of the dual connectivity will be described. FIG. 9 and FIG. 10 illustrate that a terminal apparatus 1 is connected to a plurality of base station apparatuses 2 (which are indicted as a base station apparatus 2-1 and a base station apparatus 2-2 in the figures) simultaneously. It is considered that the base station apparatus 2-1 is a base station apparatus which constitutes a macro cell and the base station apparatus 2-2 is a base station apparatus which constitutes a small cell. In this manner, simultaneous connection of the terminal apparatus 1 by using the cells belonging to the plurality of base station apparatuses 2 is referred to as the dual connectivity. The cells of the respective base station apparatuses 2 to which the terminal apparatus 1 is connected may be operated at a same frequency or may be operated at different frequencies.

Note that, the carrier aggregation is different from the dual connectivity in that a plurality of cells are managed by one base station apparatus 2 and frequencies of the cells are different from each other. In other words, the carrier aggregation is a technique for connecting one terminal apparatus 1 and one base station apparatus 2 through a plurality of cells, while the dual connectivity is a technique for connecting one terminal apparatus 1 and a plurality of base station apparatuses 2 through a plurality of cells.

In FIG. 9 and FIG. 10, the base station apparatus 2-1 or the base station apparatus 2-2 is connected to an MME 300 and an SGW 400 thorough a backbone line. The MME 300 is a higher control station apparatus corresponding to MME (Mobility Management Entity), and performs mobility management and authentication control (security control) for the terminal apparatus 1, configuring a path of user data with respect to the base station apparatuses 2, etc. The SGW 400 is a higher control station apparatus corresponding to Serving Gateway (S-GW), and performs transmission of the user data in accordance with the path of the user data to the terminal apparatus 1, which is configured by the MME 300, etc.

Moreover, a connection path between the base station apparatus 2-1 or the base station apparatus 2-2 and the SGW 400 is referred to as an SGW interface N10 in FIG. 9 and FIG. 10. Further, a connection path between the base station apparatus 2-1 or the base station apparatus 2-2 and the MME 300 is referred to as an MME interface N20. Furthermore, a connection path between the base station apparatus 2-1 and the base station apparatus 2-2 is referred to as a base station interface N30. The SGW interface N10 is also referred to as an S1-U interface in the EUTRA. Further, the MME interface N20 is also referred to as an S1-MME interface in the EUTRA. Furthermore, the base station interface N30 is also referred to as an X2 interface in the EUTRA.

The architecture realizing the dual connectivity is able to have the configuration like in FIG. 9. In FIG. 9, the base station apparatus 2-1 and the MME 300 are connected by the MME interface N20. Moreover, the base station apparatus 2-1 and the SGW 400 are connected by the SGW interface N10. In addition, the base station apparatus 2-1 provides the base station apparatus 2-2 with communication paths with the MME 300 and/or the SGW 400 through the base station interface N30. In other words, the base station apparatus 2-2 is connected to the MME 300 and/or the SGW 400 via the base station apparatus 2-1.

Moreover, another architecture realizing the dual connectivity is able to have a configuration like in FIG. 10. In FIG. 10, the base station apparatus 2-1 and the MME 300 are connected by the MME interface N20. Moreover, the base station apparatus 2-1 and the SGW 400 are connected by the SGW interface N10. The base station apparatus 2-1 provides the base station apparatus 2-2 with a communication path with the MME 300 through the base station interface N30. In other words, the base station apparatus 2-2 is connected to the MME 300 through the base station apparatus 2-1. Moreover, the base station apparatus 2-2 is connected to the SGW 400 through the SGW interface N10.

Note that, it may be configured such that the base station apparatus 2-2 and the MME 300 are connected directly by the MME interface N20.

Description will hereinafter be given in detail for appropriate embodiments of the present invention with reference to accompanying drawings while considering above matters. Note that, in the description of the embodiments of the present invention, when it is judged that specific description of known functions or configurations involved in the embodiments of the present invention makes the subject matter of the embodiments of the present invention unclear, the detailed description thereof will be omitted.

<First Embodiment>

Description will be given below for a first embodiment of the present invention.

FIG. 1 is a block diagram illustrating one example of a terminal apparatus 1 according to the first embodiment of the present invention. This terminal apparatus 1 is configured by a reception portion 101, a demodulation portion 102, a decoding portion 103, a measurement processing portion 104, a control portion 105, an uplink buffer control portion 106, a coding portion 107, a modulation portion 108, a transmission portion 109, an uplink radio resource request control portion 110, a random access control portion 111, and a higher layer portion 112. The higher layer portion 112 is a block realizing a specific function of an RRC (Radio Resource Control) layer which carries out radio resource control as a higher layer of the terminal apparatus 1.

Moreover, the uplink buffer control portion 106, the uplink radio resource request control portion 110 and the random access control portion 111 are blocks realizing a specific function of an MAC (Medium Access Control) layer which manages a data link layer. The "portion" in the figure is an element realizing functions and each procedure of the terminal apparatus 1, which is represented also as a term of section, circuit, configuration apparatus, device, unit and the like.

Note that, the terminal apparatus 1 may have a configuration including a plurality of reception-based blocks (the reception portion 101, the demodulation portion 102 and the decoding portion 103) for supporting simultaneous reception of a plurality of frequencies (frequency bands, frequency bandwidths) or cells and a plurality of transmission-based blocks (the coding portion 107, the modulation portion 108 and the transmission portion 109) for supporting simultaneous transmission of a plurality of frequencies (frequency bands, frequency bandwidths) by the carrier aggregation and/or the dual connectivity.

With regard to reception, terminal apparatus control information is input from the higher layer portion 112 to the control portion 105. The terminal apparatus control information is information which is necessary for radio communication control of the terminal apparatus 1 and which is configured by reception control information and transmission control information, and is configured by a radio connection resource configuration, cell-specific broadcast information or a system parameter, which is transmitted individually from the base station apparatus 2, to be input to the control portion 105 as necessary by the higher layer portion 112. The control portion 105 appropriately inputs the reception control information which is control information related to reception to the reception portion 101, the demodulation portion 102 and the decoding portion 103.

The reception control information includes information such as DRX control information, a reception timing related to each channel, a multiplexing method and radio resource arrangement information in addition to information of a reception frequency band. Further, the control portion 105 inputs measurement configuration information which becomes necessary for control related to measurement of a cell to the measurement processing portion 104. The measurement configuration information is information which includes measurement event information for measurement event discrimination as to whether measurement results for a serving cell and a neighboring cell measured by the terminal apparatus 1 have satisfied a specified measurement event. Further, the measurement configuration information is information which includes neighboring cell information for discriminating whether or not a measurement result for a neighboring cell measured by the terminal apparatus 1 satisfies a selection reference related to cell selection.

A reception signal is received at the reception portion 101. The reception portion 101 receives a signal with a frequency band specified by the reception control information. The received signal is input to the demodulation portion 102. The demodulation portion 102 performs demodulation of the received signal and inputs the signal to the decoding portion 103 to decode downlink data and downlink control data correctly, and each decoded data is input to the higher layer portion 112. Each data is also input to the measurement processing portion 104.

Moreover, the measurement processing portion 104 measures reception quality of a downlink reference signal (SIR, SINR, RSRP, RSRQ, RSSI, path-loss or the like) of a detected neighboring cell (component carrier) to generate a necessary measurement result. The RSRP is a value indicating a magnitude of receiving power of the downlink reference signal, and the RSRQ is a value indicating quality of the downlink reference signal.

The measurement processing portion 104 uses the measurement result as cell quality information for determining whether or not a measurement even based on the measurement event information which is configured is successful. Moreover, the measurement processing portion 104 uses the measurement result as quality information for a selection reference for cell selection or cell reselection based on the neighboring cell information which is configured. Note that, the signal used for measurement is not limited to the downlink reference signal, and other signal may be measured as long as being a signal used for measuring quality of a cell, such as a CSI-RS.

In addition, with regard to transmission, the terminal apparatus control information which is a control parameter for controlling each block is input from the higher layer portion 112 to the control portion 105, and the transmission control information which is control information related to transmission is appropriately input to the uplink buffer control portion 106, the coding portion 107, the modulation portion 108 and the transmission portion 109. The transmission control information includes information such as DTX control information, coding information, modulation information, information of a transmission frequency band, a transmission timing related to each channel, a multiplexing method and radio resource arrangement information as uplink scheduling information of a transmitted signal.

Random access configuration information is input from the higher layer portion 112 to the random access control portion 111. The random access configuration information includes preamble information, radio resource information for transmission of a physical random access channel (such as power adjustment parameter or the number of times of retransmission of a maximum preamble). The higher layer portion 112 may configure plural pieces of random access configuration information corresponding to a plurality of cells, respectively, to the random access control portion 111. Further, the higher layer portion 112 manages transmission timing adjustment information and a transmission timing timer which are used for adjustment of an uplink transmission timing, and manages a state of the uplink transmission timing (transmission timing adjustment state or transmission timing non-adjustment state) for each cell (or for each cell group or for each TA group). The transmission timing adjustment information and the transmission timing timer are included in the transmission control information.

Note that, when it is necessary to manage the state of a plurality of uplink transmission timings, the higher layer portion 112 manages transmission timing adjustment information corresponding to an uplink transmission timing of each of the plurality of cells (or a cell group and a TA group).

Invoked transmission data (uplink data and uplink control data) is input from the higher layer portion 112 to the uplink buffer control portion 106 at an arbitrary timing. At this time, the uplink buffer control portion 106 calculates a quantity of the input transmission data (uplink buffering quantity). Moreover, the uplink buffer control portion 106 has a function of discriminating whether the input transmission data is data belonging to a control-plane or data belonging to a user-plane.

Resource request configuration information is configured to the uplink radio resource request control portion 110 by the higher layer portion 112. Note that, the resource request configuration information is a part of uplink control channel configuration information. The resource request configuration information includes at least maximum transmission counter configuration information and radio resource request prohibit timer information. The higher layer portion 112 may configure plural pieces of resource request configuration information corresponding to a plurality of cells, respectively, to the uplink radio resource request control portion 110. Further, the uplink buffer control portion 106, when transmission data is input to the uplink buffer control portion 106, notifies the uplink radio resource request control portion 110 of occurrence of the transmission data to thereby inform that the transmission data exists in an uplink buffer.

The uplink radio resource request control portion 110 judges whether a radio resource needed for transmission of the input transmission data is allocated. The uplink radio resource request control portion 110 selects any one of a physical uplink shared channel PUSCH, a radio resource request by a physical uplink control channel (SR-PUCCH) and a physical random access channel, and requests control processing for transmitting the selected channel to the coding portion 107 and/or the random access control portion 111.

That is, when the radio resource has been already allocated and a state in which the transmission data is able to be transmitted by the physical uplink shared channel PUSCH has come, the coding portion 107 acquires the transmission data corresponding to the radio resource which has been allocated from the uplink buffer control portion 106 for coding in accordance with an instruction of uplink radio resource request control portion 110, followed by outputting to the modulation portion 108. Alternatively, when the radio resource has not been allocated and a radio resource request by the physical uplink control channel (SR-PUCCH) is allowed, the coding portion 107 codes control data needed for transmission of the SR-PUCCH in accordance with an instruction of the uplink radio resource request control portion 110 to output to the modulation portion 108.

Note that, description will be given below as to transmission of which SR-PUCCH is to be controlled with priority by the uplink radio resource request control portion 110 when radio resource requests by a plurality of physical uplink control channels (SR-PUCCHs) are allowed.

Alternatively, when the radio resource has not been allocated and the a radio resource request by the physical uplink control channel (SR-PUCCH) is not allowed, the coding portion 107 instructs the random access control portion 111 to start random access procedure. At this time, the coding portion 107 generates a preamble sequence, which is transmitted by the physical random access channel, based on random access data information input from the random access control portion 111. Moreover, the coding portion 107 appropriately codes each data in accordance with the transmission control information to output to the modulation portion 108.

Note that, when configurations of a plurality of physical random access channels (random access configuration information) are allocated, the random access control portion 111 performs control so as to allow a radio resource request (RACH-SR) with the random access procedure only in a primary cell. That is, control is performed so that the random access procedure in a secondary cell is carried out only when an instruction of start is given from the base station apparatus 2.

The modulation portion 108 performs modulation processing appropriately based on a channel structure for transmitting output from the coding portion 107. The transmission portion 109 performs mapping of output of the modulation portion 108 to a frequency domain as well as converts a signal of the frequency domain into a signal of a time domain and carries it on a carrier wave of a given frequency to perform power amplification. The transmission portion 109 further adjusts an uplink transmission timing in accordance with transmission timing adjustment information for each cell (or for each cell group or for each TA group) input from the higher layer portion 112. The physical uplink shared channel in which uplink control data is arranged is able to include, for example, a layer 3 message (radio resource control message; RRC message) in addition to user data.

In FIG. 1, though other components of the terminal apparatus 1 are omitted, it is apparent that a plurality of blocks having other functions necessary for operation as the terminal apparatus 1 are included as components.

Figure 2:
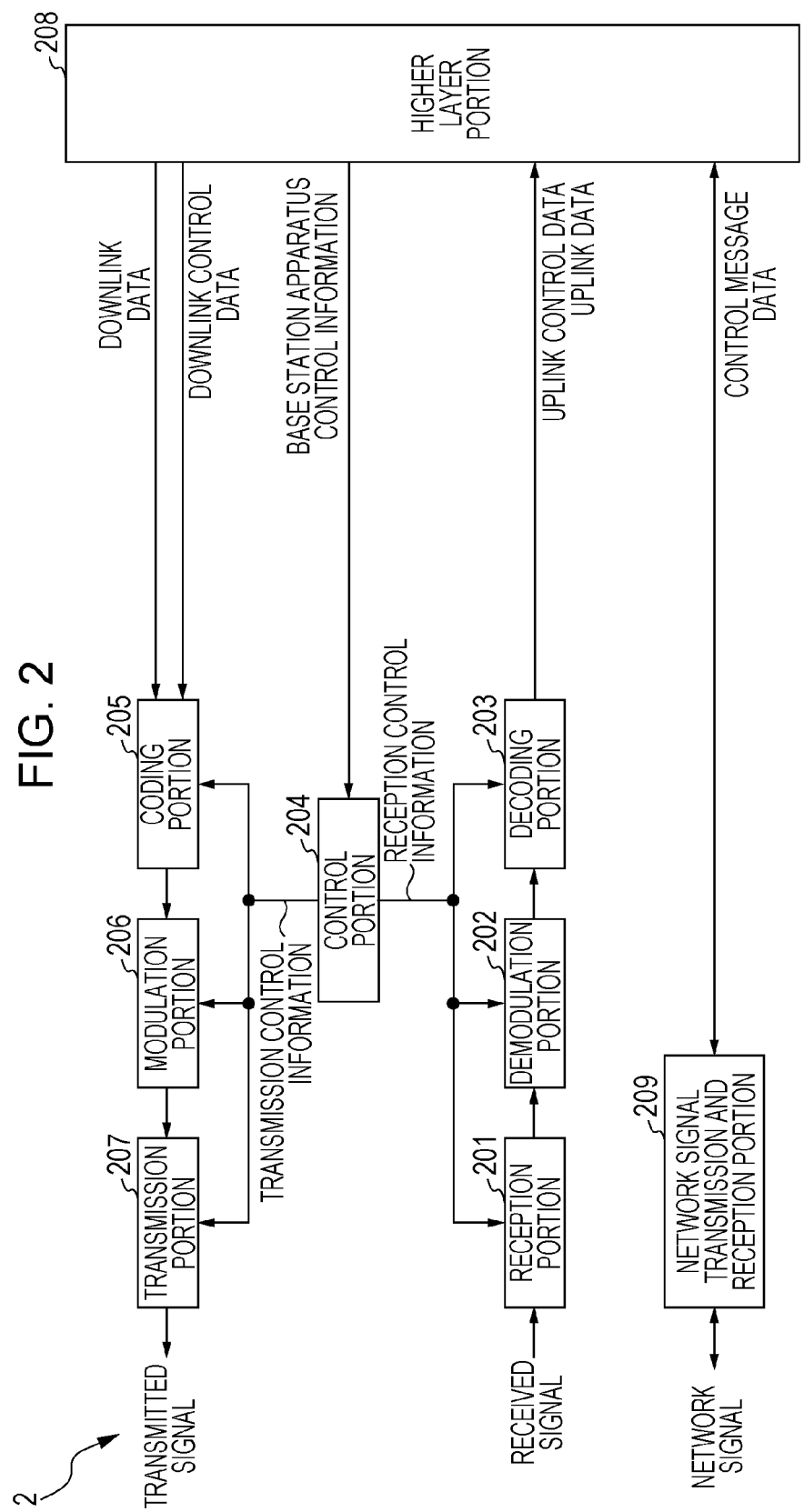
FIG. 2 is a block diagram illustrating one example of a schematic configuration of a base station apparatus according to the embodiment of the present invention.

FIG. 2 is a block diagram illustrating one example of the base station apparatus 2 according to the first embodiment of the present invention. This base station apparatus is configured by a reception portion 201, a demodulation portion 202, a decoding portion 203, a control portion 204, a coding portion 205, a modulation portion 206, a transmission portion 207, a higher layer portion 208, and a network signal transmission and reception portion 209.

Note that, the base station apparatus 2 may include a plurality of reception-based blocks (the reception portion 201, the demodulation portion 202 and the decoding portion 203) and a plurality of transmission-based blocks (the coding portion 205, the modulation portion 206 and the transmission portion 207) for supporting a plurality of frequencies (frequency bands, frequency bandwidths). The "portion" in the figure is an element realizing functions and each procedure of the base station apparatus 2, which is represented also as a term of section, circuit, configuration apparatus, device, unit and the like.

The higher layer portion 208 is a block realizing a specific function of an RRC (Radio Resource Control) layer which carries out radio resource control as a higher layer of the base station apparatus 2.

The higher layer portion 208 inputs downlink data and downlink control data to the coding portion 205. The coding portion 205 codes the input data to input to the modulation portion 206. The modulation portion 206 performs modulation of a coded signal. Further, the signal output from the modulation portion 206 is input to the transmission portion 207. After mapping the input signal into a frequency domain, the transmission portion 207 converts the signal of the frequency domain into a signal of a time domain for transmission by carrying on a carrier wave of a given frequency to perform power amplification. A physical downlink shared channel in which the downlink control data is arranged typically configures a layer 3 message (RRC message).

Moreover, the reception portion 201 converts a signal received from the terminal apparatus 1 into a base-band digital signal. When cells of a plurality of different transmission timings are configured to the terminal apparatus 1, the reception portion 201 receives a signal at different timings for each cell (or for each cell group or for each TA group). The digital signal converted at the reception portion 201 is input to the demodulation portion 202 and demodulated. The signal demodulated at the demodulation portion 202 is subsequently input to the decoding portion 203 and decoded, and uplink control data and uplink data which are decoded correctly are output to the higher layer portion 208.

Base station apparatus control information needed for control of each of these blocks is information needed for radio communication control of the base station apparatus 2, which is configured by reception control information and transmission control information, and is configured by a higher network apparatus (MME (MME 30), gateway apparatus (SGW 400), OAM or the like) or a system parameter, to be input to the control portion 204 as necessary by the higher layer portion 208.

The control portion 204 appropriately inputs the base station apparatus control information involved in transmission as the transmission control information to each of the blocks of the coding portion 205, the modulation portion 206 and the transmission portion 207, and the base station apparatus control information involved in reception as the reception control information to each of the blocks of the reception portion 201, the demodulation portion 202 and the decoding portion 203. RRC of the base station apparatus 2 exists as a part of the higher layer portion 208.

On the other hand, the network signal transmission and reception portion 209 performs transmission (transfer) or reception of a control message or user data between the base station apparatuses 2 or between a higher network apparatus (for example, the MME 300 or the SGW 400) and the base station apparatus 2. In FIG. 2, though other components of the base station apparatus 2 are omitted, it is apparent that a plurality of blocks having other functions necessary for operation as the base station apparatus 2 are included as components.

Description will be given for a method for managing a physical uplink control channel related to the first embodiment of the present invention. The terminal apparatus 1 is configured so as to be able to transmit the physical uplink control channel in a plurality of cells during communication by dual connectivity with a plurality of base station apparatuses 2. The dual connectivity may be realized by a connection method exemplified in FIG. 9 or FIG. 10 or may be realized by another connection method.

Figure 3:
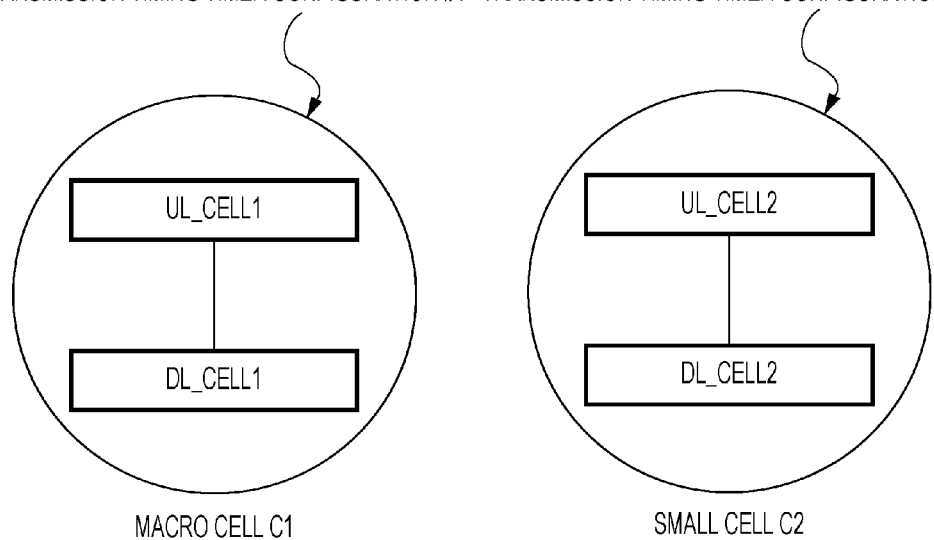
FIG. 3 is a diagram illustrating one example of a configuration content related to transmission and reception control that is configured to the terminal apparatus according to the embodiment of the present invention.

FIG. 3 illustrates one example of a configuration content related to transmission and reception control that is configured to the terminal apparatus 1 according to the first embodiment of the present invention. In the figure, a first downlink (DL_CELL1) and a first uplink (UL_CELL1) correspond to a first cell (which is set as a macro cell C1 in FIG. 3) used for connection by the dual connectivity, and a second downlink (DL_CELL2) and a second uplink (UL_CELL2) correspond to a second cell (which is set as a small cell C2 in FIG. 3) used for connection by the dual connectivity. Note that, the number of cells is not limited to that of FIG. 3, and it may be configured so that a plurality of other cells in addition to the first cell and the second cell may be used for connection by the dual connectivity.

First, plural pieces of cell group configuration information (a cell group configuration #1 and a cell group configuration #2) are notified to the terminal apparatus 1 as one of radio connection resource configurations. One or more cells are included in each cell group configuration information, and the base station apparatus 2 specifies a cell which belongs to each group by a cell index. A cell which is not specified as the cell which belongs to the group may configure one group implicitly. In the present example, classification is performed into a group which includes a macro cell and a group which includes a small cell. However, the terminal apparatus 1 does not need to discriminate types of cells. That is, the terminal apparatus 1 does not perform discrimination as to whether to be a macro cell or a small cell but performs grouping of cells in accordance with cell group configuration information notified from the base station apparatus 2.

Moreover, transmission timing timer configuration information (a transmission timing timer configuration #11 and a transmission timing timer configuration #2 ) with respect to each cell group is notified from the base station apparatus 2 to the terminal apparatus 1. That is, the base station apparatus 2 notifies the terminal apparatus 1 of these pieces of configuration information not for each cell but one piece of configuration information for each group.

Moreover, uplink control channel configuration information (an uplink control channel configuration #1 and an uplink control channel configuration #2) and random access channel configuration information (a random access channel configuration #1 and a random access channel configuration #2) with respect to each one cell of each cell group are notified from the base station apparatus 2 to the terminal apparatus 1. That is, the base station apparatus 2 does not notify the terminal apparatus 1 of these configurations for each cell but notifies the terminal apparatus 1 as configuration information with respect to one certain cell in a group. Further, the terminal apparatus 1 configures these notified configuration information to the specified cell.

The uplink control channel configuration information includes resource request configuration information. Moreover, the resource request configuration information includes at least maximum transmission counter configuration information and radio resource request prohibit timer information. The maximum transmission counter configuration information defines the number of times of transmission of a radio resource request (the maximum number of times of SR-PUCCH transmission) by an uplink control channel for the terminal apparatus 1, which is able to be transmitted in a certain cell, in other words, indicates a value of an upper limit value of a counter, which is incremented every time the terminal apparatus 1 makes the radio resource request by the uplink control channel in the certain cell.

The radio resource request prohibit timer information is information for configuring a radio resource request prohibit timer (SR Prohibit Timer), and the radio resource request prohibit timer is a timer by which time counting is started when the terminal apparatus 1 uses the uplink control channel to transmit the radio resource request to the base station apparatus 2. The terminal apparatus 1 does not transmit the SR-PUCCH during time counting of the radio resource request prohibit timer.

Note that, though other configurations notified individually for each cell, for example, such as downlink control channel configuration information and uplink reference signal configuration information are omitted in FIG. 3, FIG. 3 does not intend that the terminal apparatus 1 is not notified of these configuration information and it is apparent that the terminal apparatus 1 is appropriately notified of these configuration information even if not being illustrated.

Here, in the macro cell C1 which belongs to the cell group configuration #1 (referred to as a cell group 1), transmission control of uplink of the terminal apparatus 1 is managed by a transmission timing timer (TAT1) which is configured by the transmission timing timer configuration #1. In the same manner, in the small cell C2 which belongs to the cell group configuration #2 (referred to as a cell group 2), transmission control of uplink of the terminal apparatus 1 is managed by a transmission timing timer (TAT2) which is configured by the transmission timing timer configuration #2.

That is, the terminal apparatus 1 to which the uplink control channel configuration #2 is configured is able to transmit a radio resource request by the physical uplink control channel (SR-PUCCH) based on the uplink control channel configuration #2 to the uplink of the small cell C2 when the transmission timing timer (TAT2) is counting time.

Figure 4:
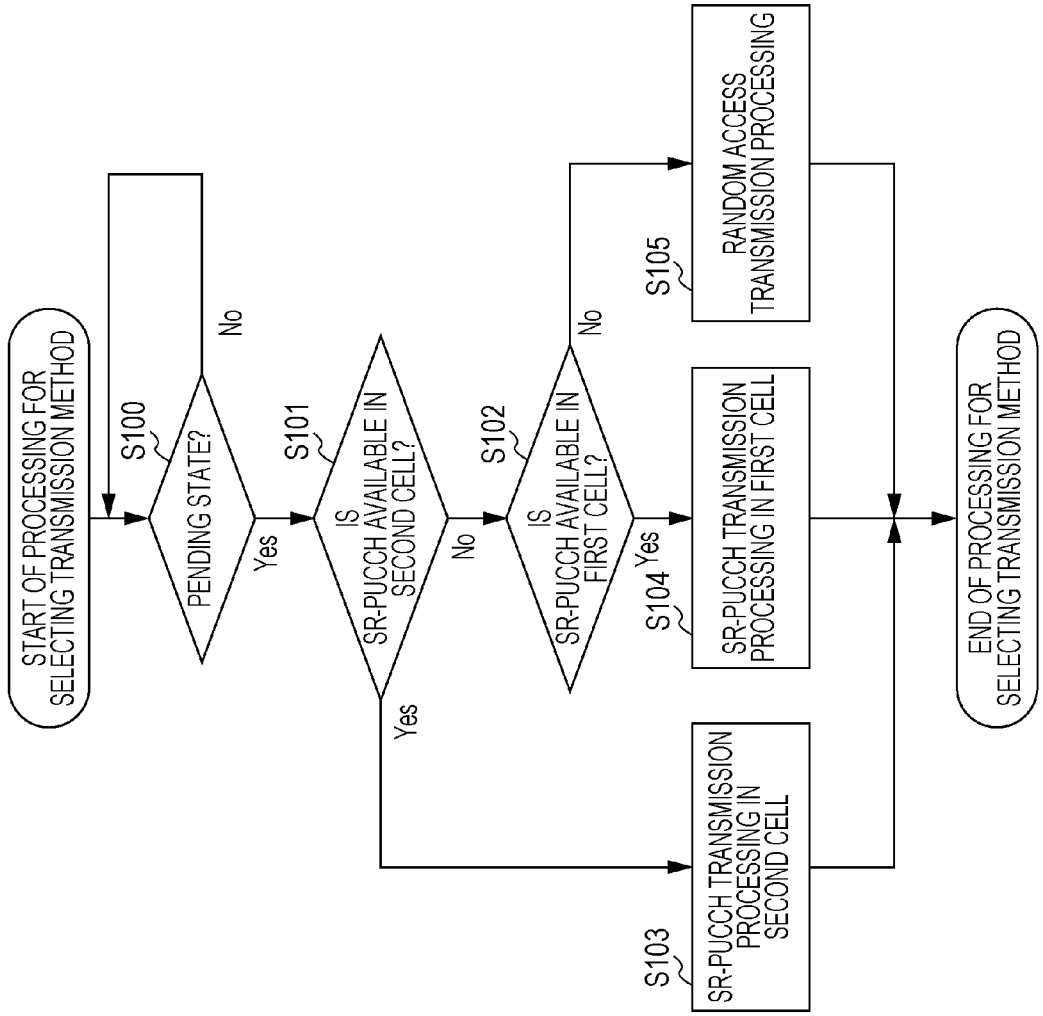
FIG. 4 is a flowchart illustrating one example of processing for selecting a transmission method related to a radio resource request of a terminal apparatus in a first embodiment of the present invention.

FIG. 4 is a flowchart illustrating one example of processing for selecting a transmission method related to a radio resource request of the terminal apparatus 1 in the first embodiment of the present invention. FIG. 4 is carried out in a MAC layer (that is, each block realizing functions of the MAC layer).

The terminal apparatus 1 manages two states of a pending sate and a non-pending state as state shift of a radio resource request (SR state). The SR state of the terminal apparatus 1 is managed by the MAC layer. When transmission data exists (when being invoked) in the terminal apparatus 1, the SR state of the terminal apparatus 1 is changed into the pending state. The terminal apparatus 1 judges (determines, decides) whether or not the SR state of the terminal apparatus 1 is the pending state at step S100.

When the SR state is the non-pending state (No at step S100), the terminal apparatus 1 repeats the processing of step S100 until the pending state comes. When the SR state is the pending state (Yes at step S100), the terminal apparatus 1 judges (determines, decides) whether or not an SR-PUCCH is available in a second cell (step S101).

The second cell is a cell in a group which does not include a primary cell among cell groups instructed from the base station apparatus 2. A cell in a group which includes the primary cell is referred to as a primary cell group and a group of cells which does not include the primary cell is referred to as a secondary cell group among the cell groups instructed from the base station apparatus 2. That is, the second cell is the secondary cell, and a cell which belongs to the secondary cell group.

Specifically, the terminal apparatus 1 judges whether the SR-PUCCH is available in the second cell based on whether uplink control channel configuration information is configured in any of second cells or a specific second cell. The specific second cell is, for example, a cell which is specified from the base station apparatus 2, a cell which has most excellent reception quality of the downlink, a cell to which transmission power of the uplink is configured to be lowest, a cell serving as a reference of a transmission timing of the uplink (timing reference cell), a cell to which a random access configuration is notified, a cell having a minimum cell index in the secondary cell group, or the like.

The terminal apparatus 1 may not consider a second cell in a deactivation state and/or a second cell which belongs to a cell group for which time counting of the transmission timing timer is not performed as a cell for which whether the SR-PUCCH is available is judged. Further, a second cell during time counting of the radio resource request prohibit timer may not be considered as a cell for which whether the SR-PUCCH is available is judged.

When the SR-PUCCH is available in the second cell (Yes at step S101), the terminal apparatus 1 selects transmission processing of the SR-PUCCH to the uplink of the second cell based on the uplink control channel configuration information which is configured to the second cell (step S103). On the other hand, when the SR-PUCCH is not available in the second cell (No at step S101), the terminal apparatus 1 judges (determines, decides) whether the SR-PUCCH is available in a first cell (step S102). That is, the SR-PUCCH of the second cell is given priority over the SR-PUCCH of the first cell. The first cell is the primary cell.

Specifically, the terminal apparatus 1 judges whether the SR-PUCCH is available in the first cell based on whether uplink control channel configuration information is configured in the first cell. When the SR-PUCCH is available in the first cell (Yes at step S102), the terminal apparatus 1 selects transmission processing of the SR-PUCCH to the uplink of the first cell based on the uplink control channel configuration information which is configured to the first cell (step S104). On the other hand, when the SR-PUCCH is not available in the first cell (No at step S102), the terminal apparatus 1 selects to perform random access transmission processing to the uplink of the first cell based on random access channel configuration information which is configured to the first cell (step S105).

Moreover, when the SR-PUCCH is available in a second cell of a plurality of cell groups (that is, secondary cell groups), the terminal apparatus 1 judges (determines, decides) a cell group for which transmission processing of the SR-PUCCH is performed based on any of following methods. For example, based on (a) a cell group which includes a second cell having a smallest cell index, (b) a cell group which includes a second cell having the largest cell index, (c) a cell group having highest priority, (d) a cell group having a smallest index of a cell group, or (e) a cell group having a largest index of a cell group, the cell group is judged, and the SR-PUCCH transmission processing is performed in the second cell of the judged cell group. Priority information indicating priority of the cell group in (c) is notified from the base station apparatus 2.

The terminal apparatus 1 may not consider a first cell which belongs to a cell group for which time counting of the transmission timing timer is not performed as a cell for which whether the SR-PUCCH is available is judged. Further, a first cell during time counting of the radio resource request prohibit timer may not be considered as a cell for which whether the SR-PUCCH is available is judged.

Note that, the terminal apparatus 1 may perform the processing of step S101 and step S102 at the same time. That is, when the terminal apparatus 1 is able to transmit the SR-PUCCH to both of the first cell and the second cell, in other words, when the uplink control channel configuration information is notified to both of the first cell and the second cell, the terminal apparatus 1 may be configured so as to give priority to perform transmission of the SR-PUCCH based on the uplink control channel configuration information which is configured to the second cell.

Figure 5:
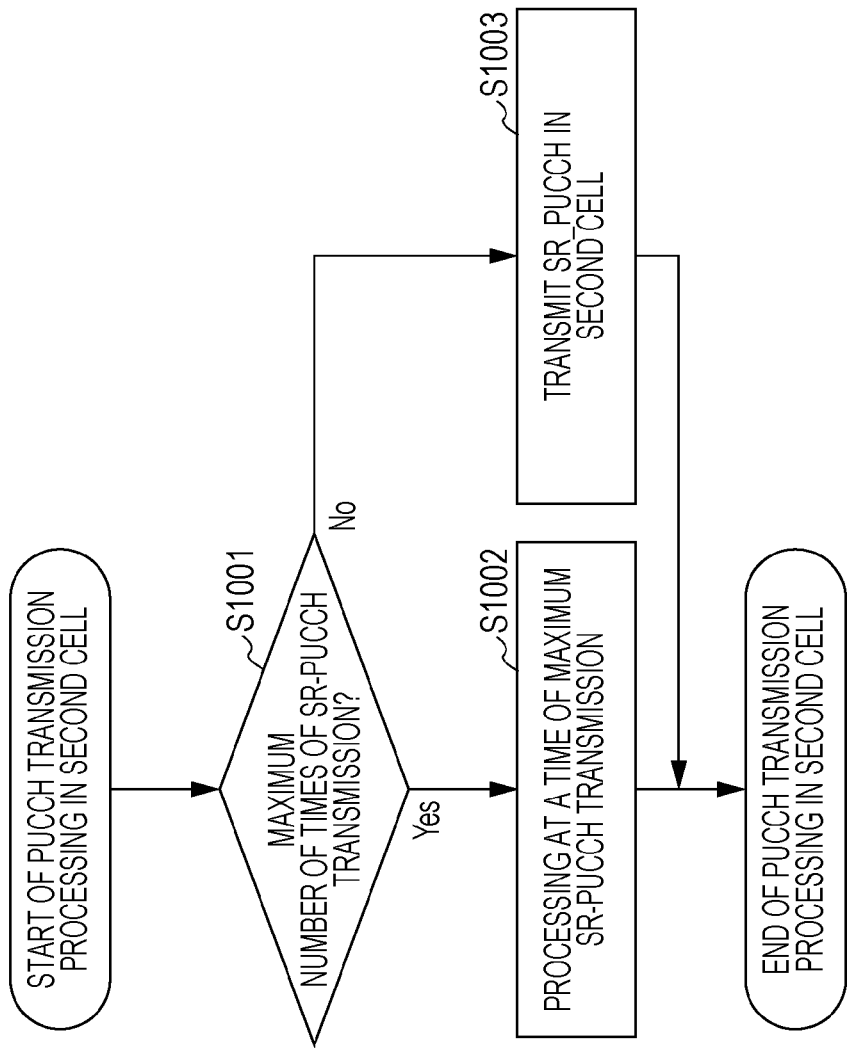
FIG. 5 is a flowchart illustrating one example of processing related to the number of times of transmission of the radio resource request of the terminal apparatus in the first embodiment of the present invention.

FIG. 5 is a flowchart illustrating one example of processing related to transmission processing of the radio resource request of the terminal apparatus 1 in the first embodiment of the present invention.

The processing of FIG. 5 is processing corresponding to the SR-PUCCH transmission processing in the second cell in FIG. 4. That is, it can be carried out in the terminal apparatus 1 which has judged (determined, decided) that the SR-PUCCH is available in the second cell. A condition for judging (determining, deciding) for selecting the SR-PUCCH in the second cell by the terminal apparatus 1 may be in accordance with FIG. 4 or another condition may be based on.

The terminal apparatus 1 judges (determines, decides) whether the number of times of SR-PUCCH transmission in the second cell reaches the maximum number of times of SR-PUCCH transmission at step S1001, and when the number of times of SR-PUCCH transmission reaches the maximum number of times of SR-PUCCH transmission (Yes at step S1001), performs processing at a time of maximum SR-PUCCH transmission (step S1002). On the other hand, when the number of times of SR-PUCCH transmission does not reach the maximum number of times of SR-PUCCH transmission (No at step S1001), the terminal apparatus 1 increments the number of times of SR-PUCCH transmission, and keeps the SR state at the pending state and transmits the SR-PUCCH to the uplink of the second cell based on an uplink control channel configuration #2 (step S1003).

Here, as the maximum number of times of SR-PUCCH transmission, two different values may be used in the first cell and the second cell, a common value may be used individually in the first cell and the second cell, or one value may be used in a shared manner in the first cell and the second cell. Further, as a value of the maximum number of times of SR-PUCCH transmission, two different values may be used in the first cell and the second cell or one value may be used in a shared manner in the first cell and the second cell.

As the processing at a time of maximum SR-PUCCH transmission at step S1002, the terminal apparatus 1 performs any of processing of (1) releasing the uplink control channel configuration information of the second cell and (2) releasing only one related to the SR-PUCCH of the second cell among the uplink control channel configuration information.

That is, in the case of (1), the terminal apparatus 1 releases the uplink control channel configuration information related to the SR-PUCCH of the second cell, uplink control channel configuration information related to report of ACK/NACK of the second cell, and uplink control channel configuration information related to report of CSI of the second cell. In the case of (2), the terminal apparatus 1 releases the uplink control channel configuration information related to the SR-PUCCH of the second cell, while keeping the uplink control channel configuration information related to report of ACK/NACK of the second cell and the uplink control channel configuration information related to report of CSI of the second cell.

Note that, the SR state is kept at the pending state in both cases. The terminal apparatus 1 may release uplink reference configuration information of the second cell at step S1002. Moreover, the terminal apparatus 1 may change the second cell into the deactivation state. Further, clearing (flushing) of a transmission buffer (uplink buffer) of the uplink corresponding to the second cell (cell group) may be performed. The release of the uplink control channel configuration information is desired to be carried out in an RRC layer.

Figure 6:
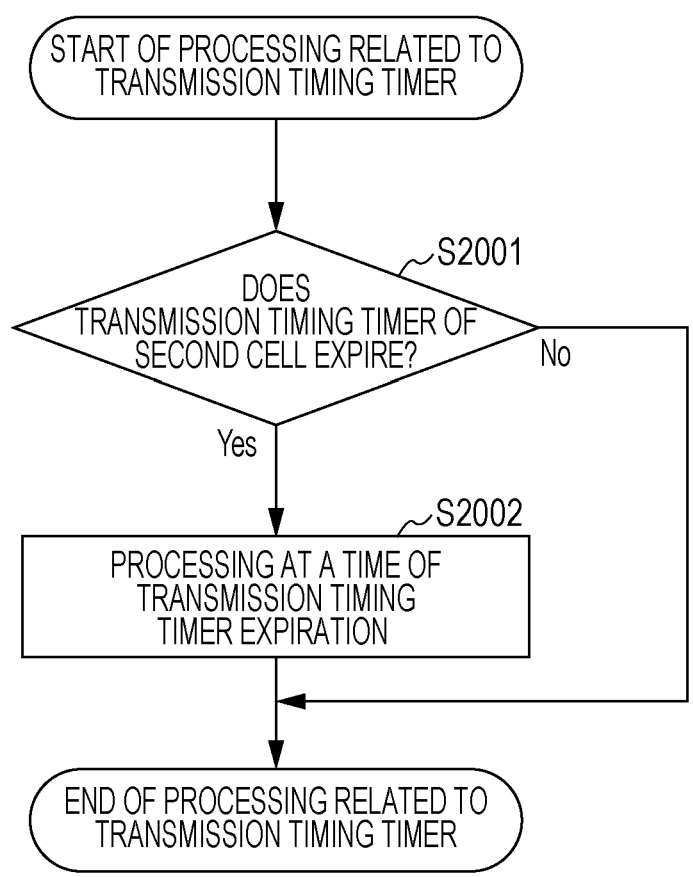
FIG. 6 is a flowchart illustrating one example of processing related to a transmission timing timer of the terminal apparatus in the first embodiment of the present invention.

FIG. 6 is a flowchart illustrating one example of processing related to a transmission timing timer of the terminal apparatus 1 in the first embodiment of the present invention.

The processing of FIG. 6 is processing used as one of judgment as to whether or not the SR-PUCCH is available in the second cell in FIG. 4. That is, it can be carried out in the terminal apparatus 1 which considers a transmission timing timer of the second cell as to whether or not the SR-PUCCH is available in the second cell.

The terminal apparatus 1 judges (determines, decides) whether the transmission timing timer of the second cell (TAT2) expires at step S2001. In other words, the terminal apparatus 1 judges (determines, decides) whether or not the state of the uplink corresponding to the cell group to which the second cell belong (cell group 2) becomes a transmission timing non-adjustment state at step S2001.

When the transmission timing timer of the second cell expires (Yes at step S2001), the terminal apparatus 1 performs transmission timing timer expiration processing (step S2002). On the other hand, when the transmission timing timer of the second cell does not expire (No at step S2001), the terminal apparatus 1 continues time counting of the transmission timing timer of the second cell and ends the processing. Here, as a value of the transmission timing timer, two different values may be used in the first cell and the second cell or a common value may be used individually in the first cell and the second cell.

As the transmission timing timer expiration processing of step S2002, the terminal apparatus 1 performs any of processing of (1) releasing the uplink control channel configuration information of the second cell and (2) releasing only one related to the SR-PUCCH of the second cell among the uplink control channel configuration information.

That is, in the case of (1), the terminal apparatus 1 releases the uplink control channel configuration information related to the SR-PUCCH of the second cell, uplink control channel configuration information related to report of ACK/NACK of the second cell, and uplink control channel configuration information related to report of CSI of the second cell. In the case of (2), the terminal apparatus 1 releases the uplink control channel configuration information related to the SR-PUCCH of the second cell, while keeping the uplink control channel configuration information related to report of ACK/NACK of the second cell and the uplink control channel configuration information related to report of CSI of the second cell.

Note that, the SR state is kept at the pending state in both cases. The terminal apparatus 1 may release uplink reference configuration information of the second cell at step S2002. Moreover, the terminal apparatus 1 may change the second cell into the deactivation state. Further, clearing (flushing) of a transmission buffer (uplink buffer) of the uplink corresponding to the second cell (cell group) may be performed. The release of the uplink control channel configuration information is desired to be carried out in the RRC layer.

The terminal apparatus 1 may perform the processing (1) or (2) based on whether the radio resource request is allowed in the second cell. That is, it may be configured such that when the uplink control channel configuration information is notified to the second cell, the terminal apparatus 1 performs the processing (1) or (2), and when the uplink control channel configuration information is not notified to the second cell, the terminal apparatus 1 performs clearing of the transmission buffer of the uplink corresponding to the second cell (cell group) and releasing of the uplink reference configuration information when the transmission timing timer expires.

Alternatively, the terminal apparatus 1 may perform the processing (1) or (2) based on whether to be a type of a cell allowing the radio resource request in the second cell. That is, it may be configured such that when the uplink control channel configuration information is notified and the second cell is a cell connected by the dual connectivity, or when the second cell is a small cell, the terminal apparatus 1 performs the processing (1) or (2).

With such a configuration, the terminal apparatus 1 is able to transmit a physical uplink control channel corresponding to a plurality of cells or a cell group, and make a radio resource request appropriately to the base station apparatus 2. That is, the terminal apparatus 1 is able to perform a communication method for appropriately selecting, based on configuration information of the terminal apparatus 1, a radio resource request using any of a physical uplink control channel corresponding to a certain first cell group, a physical random access channel corresponding to a certain first cell group and a physical uplink control channel corresponding to a certain second cell group.

The terminal apparatus 1 of the present embodiment becomes possible to carry out efficient procedure of transmitting uplink control information based on configuration information notified to the terminal apparatus 1. Moreover, the base station apparatus 2 of the present embodiment becomes possible to cause the terminal apparatus 1 to cope with a network in which a physical uplink control channel is configured to a plurality of cells by notifying appropriate control information of the uplink for selecting procedure of transmitting the uplink control information.

According to the first embodiment, since the terminal apparatus 1 is able to select and transmit an appropriate transmission processing method of a radio resource request based on cells and control information of the uplink configured from the base station apparatus 1, the transmission procedure is made more efficient. Moreover, since the base station apparatus 2 receives the radio resource request transmitted based on the efficient transmission procedure in the terminal apparatus 1, it is possible to provide the terminal apparatus 1 with appropriate scheduling using a plurality of cells. Therefore, it is possible to improve throughput for the terminal apparatus 1.

<Second Embodiment>

Description will be given below for a second embodiment of the present invention.

In the second embodiment, description will be given for transmission control for switching cells for which availability of an SR-PUCCH is judged according to a content of transmission data in an SR state that is subjected to pending. Since the terminal apparatus 1 and the base station apparatus 2 in the second embodiment may have a same configuration as that of the first embodiment except for that a part of processing for selecting a transmission method related to a radio resource request is different, description thereof will be omitted.

Figure 7:
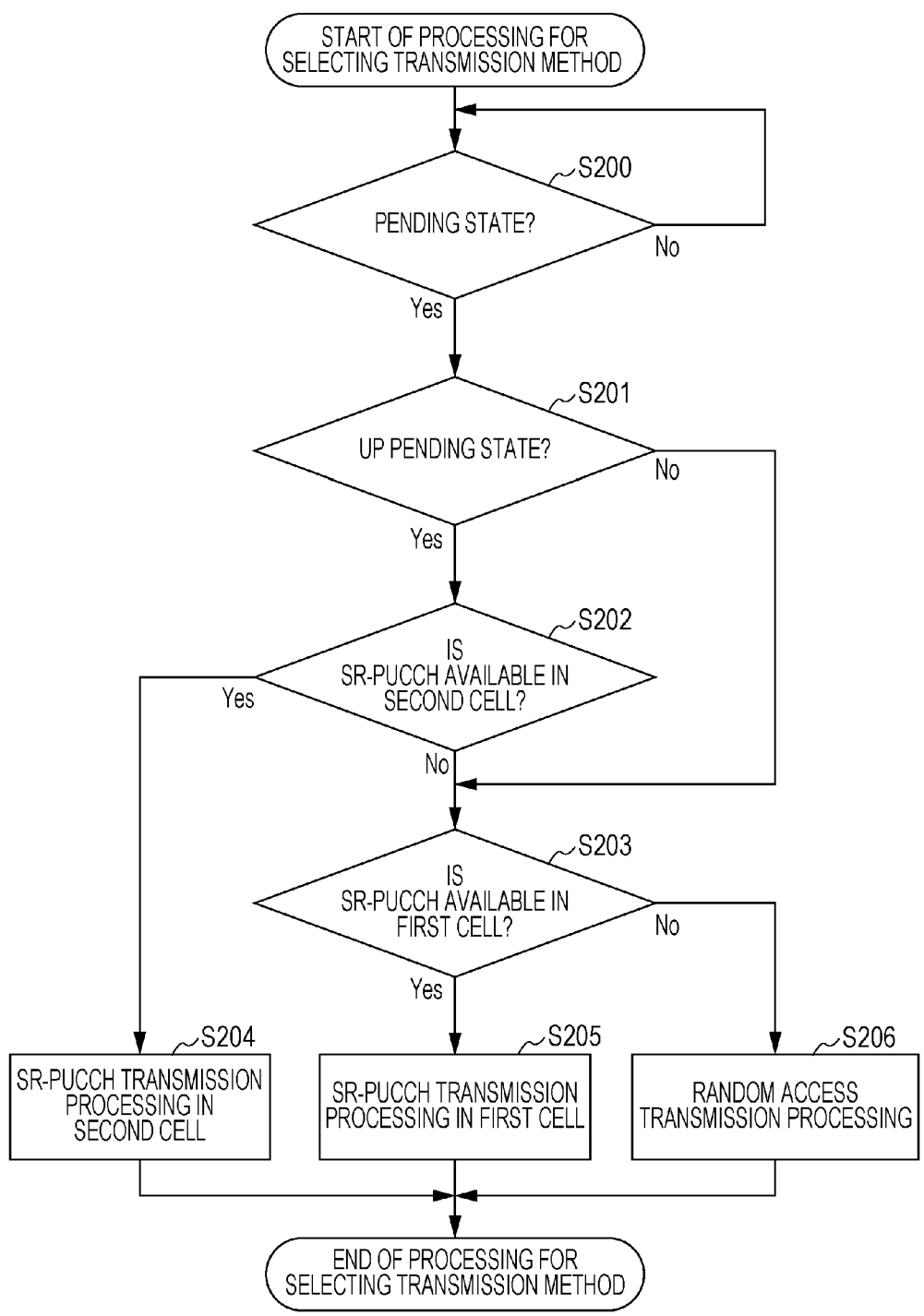
FIG. 7 is a flowchart illustrating one example of processing for selecting a transmission method related to a radio resource request of a terminal apparatus in a second embodiment of the present invention.

FIG. 7 is a flowchart illustrating one example of processing for selecting a transmission method related to a radio resource request of the terminal apparatus 1 in the second embodiment of the present invention. FIG. 7 is carried out in the MAC layer (that is, each block realizing functions of the MAC layer). Meanings of a first cell and a second cell are same as those of FIG. 4.

The terminal apparatus 1 judges (determines, decides) whether or not the SR state of the terminal apparatus 1 is the pending state at step S200. When the SR state is the non-pending state (No at step S200), the terminal apparatus 1 repeats the processing of step S200 until the pending state comes. When the SR state is the pending state (Yes at step S200), the terminal apparatus 1 judges (determines, decides) whether transmission data of an uplink buffer that has changed the SR state to the pending state belongs to a user plane (step S201).

Specifically, when not-yet-transmitted transmission data which is included in a transmission buffer of the uplink (uplink buffer) belongs to a control plane (No at step S201), processing of step S203 is carried out. On the other hand, when the not-yet-transmitted transmission data which is included in the uplink buffer belongs to the user plane (Yes at step S201), processing of step S202 is carried out.

The terminal apparatus 1 may judge which transmission data belonging to the control plane or the user plane the transmission data of the uplink buffer is based on a type of a logical channel notified from the base station apparatus 2 or a higher layer. For example, the terminal apparatus 1 may judge that the transmission data of the uplink buffer belongs to the control plane when the transmission data of the uplink is associated with a logical control channel (DCCH, CCCH). Further, for example, the terminal apparatus 1 may judge that the transmission data of the uplink buffer belongs to the user plane when the transmission data of the uplink is associated with a logical traffic channel (DTCH).

Furthermore, the terminal apparatus 1 may judge that the transmission data of the uplink buffer belongs to the control plane when the transmission data of the uplink is associated with both of the logical control channel and the logical traffic channel. In addition, the terminal apparatus 1 may judge that the transmission data of the uplink buffer belongs to the user plane when the transmission data of the uplink is associated with both of the logical control channel and the logical traffic channel.

Alternatively, the terminal apparatus 1 may judge which transmission data belonging to the control plane or the user plane the transmission data of the uplink buffer is based on a type of a radio bearer notified from the base station apparatus 2 or a higher layer. For example, the terminal apparatus 1 may judge that the transmission data of the uplink buffer belongs to the control plane when the transmission data of the uplink is associated with a signaling radio bearer (SRB). Further, for example, the terminal apparatus 1 may judge that the transmission data of the uplink buffer belongs to the user plane when the transmission data of the uplink is associated with a data radio bearer (DRB).

Furthermore, the terminal apparatus 1 may judge that the transmission data of the uplink buffer belongs to the control plane when the transmission data of the uplink is associated with both of the signaling radio bearer and the data radio bearer. In addition, the terminal apparatus 1 may judge that the transmission data of the uplink buffer belongs to the user plane when the transmission data of the uplink is associated with both of the signaling radio bearer and the data radio bearer.

Alternatively, the terminal apparatus 1 may judge which transmission data belonging to the control plane or the user plane the transmission data of the uplink buffer is based on any of QoS (Quality of Service), QCI (QoS Class Identifier) and priority of a logical channel, which are notified from the base station apparatus 2 or a higher layer, or a combination thereof.

The terminal apparatus 1 judges (determines, decides) whether or not an SR-PUCCH is available in the second cell at step S202. Specifically, the terminal apparatus 1 judges whether the SR-PUCCH is available in the second cell based on whether uplink control channel configuration information is configured in any of the second cells or a specific second cell. The specific second cell is, for example, a cell which is specified from the base station apparatus 2, a cell which has most excellent reception quality of the downlink, a cell to which transmission power of the uplink is configured to be lowest, a cell serving as a reference of a transmission timing of the uplink (timing reference cell), a cell to which a random access configuration is notified, a cell having a minimum cell index in the secondary cell group, or the like.

The terminal apparatus 1 may not consider a second cell in a deactivation state and/or a second cell which belongs to a cell group for which time counting of the transmission timing timer is not performed as a cell for which whether the SR-PUCCH is available is judged. Further, a second cell during time counting of the radio resource request prohibit timer may not be considered as the cell for which whether the SR-PUCCH is available is judged.

When the SR-PUCCH is available in the second cell (Yes at step S202), the terminal apparatus 1 selects transmission processing of the SR-PUCCH to the uplink of the second cell based on the uplink control channel configuration information which is configured to the second cell (step S204). On the other hand, when the SR-PUCCH is not available in the second cell (No at step S202), the terminal apparatus 1 judges (determines, decides) whether the SR-PUCCH is available in the first cell (step S203). That is, the SR-PUCCH of the second cell is given priority over the SR-PUCCH of the first cell.

Specifically, the terminal apparatus 1 judges whether the SR-PUCCH is available in the first cell based on whether uplink control channel configuration information is configured in the first cell. When the SR-PUCCH is available in the first cell (Yes at step S203), the terminal apparatus 1 selects transmission processing of the SR-PUCCH to the uplink of the first cell based on the uplink control channel configuration information which is configured to the first cell (step S205). On the other hand, when the SR-PUCCH is not available in the first cell (No at step S203), the terminal apparatus 1 selects to perform random access transmission processing to the uplink of the first cell based on random access channel configuration information which is configured to the first cell (step S206).

Moreover, when the SR-PUCCH is available in the second cell of a plurality of cell groups (that is, secondary cell groups), the terminal apparatus 1 judges (determines, decides) a cell group for which transmission processing of the SR-PUCCH is performed based on any of following methods. For example, based on (a) a cell group which includes a second cell having a smallest cell index, (b) a cell group which includes a second cell having a largest cell index, (c) a cell group having highest priority, (d) a cell group having a smallest index of a cell group, or (e) a cell group having a largest index of a cell group, a cell group is judged, and the SR-PUCCH transmission processing is performed in the second cell of the judged cell group. Priority information indicating priority of the cell group in (c) is notified from the base station apparatus 2.

The terminal apparatus 1 may not consider a first cell which belongs to a cell group for which time counting of the transmission timing timer is not performed as a cell for which whether the SR-PUCCH is available is judged. Further, a first cell during time counting of the radio resource request prohibit timer may not be considered as a cell for which whether the SR-PUCCH is available is judged.

Note that, the terminal apparatus 1 may perform the processing of step S202 and step S203 at the same time. That is, when the terminal apparatus 1 is able to transmit the SR-PUCCH to both of the first cell and the second cell, in other words, when the uplink control channel configuration information is notified to both of the first cell and the second cell, the terminal apparatus 1 may be configured so as to give priority to perform transmission of the SR-PUCCH based on the uplink control channel configuration information which is configured to the second cell.

Moreover, the terminal apparatus 1 may be configured so as to perform the processing of step S201 before the processing of step S204.

With such a configuration, the terminal apparatus 1 is able to transmit a physical uplink control channel corresponding to a plurality of cells or a cell group, and make a radio resource request appropriately to the base station apparatus 2. That is, the terminal apparatus 1 is able to perform a communication method for appropriately selecting, based on configuration information of the terminal apparatus 1 and a content of the transmission data of the uplink buffer, a radio resource request using any of a physical uplink control channel corresponding to a certain first cell group, a physical random access channel corresponding to a certain first cell group and a physical uplink control channel corresponding to a certain second cell group.

The terminal apparatus 1 of the present embodiment becomes possible to carry out efficient procedure of transmitting uplink control information based on configuration information notified to the terminal apparatus 1 and a content of transmission data of an uplink buffer. Moreover, the base station apparatus 2 of the present embodiment becomes possible to cause the terminal apparatus 1 to cope with a network in which a physical uplink control channel is configured to a plurality of cells by notifying appropriate control information of an uplink for selecting the procedure of transmitting the uplink control information.

According to the second embodiment, since the terminal apparatus 1 is able to select and transmit an appropriate transmission processing method of a radio resource request based on cells configured from the base station apparatus 2, control information of the uplink, and a content of transmission data of the uplink buffer, the transmission procedure is made more efficient. Moreover, since the base station apparatus 2 receives the radio resource request transmitted based on the efficient transmission procedure in the terminal apparatus 1, it is possible to provide the terminal apparatus 1 with appropriate scheduling using a plurality of cells. Therefore, it is possible to improve throughput for the terminal apparatus 1.

<Third Embodiment>

Description will be given below for a third embodiment of the present invention.

In the third embodiment, description will be given for transmission control for switching cells for which availability of an SR-PUCCH is judged according to a cell which is in the pending state. Since the terminal apparatus 1 and the base station apparatus 2 in the third embodiment may have a same configuration as that of the first embodiment except for that a part of processing for selecting a transmission method related to a radio resource request is different, description thereof will be omitted.

Figure 8:
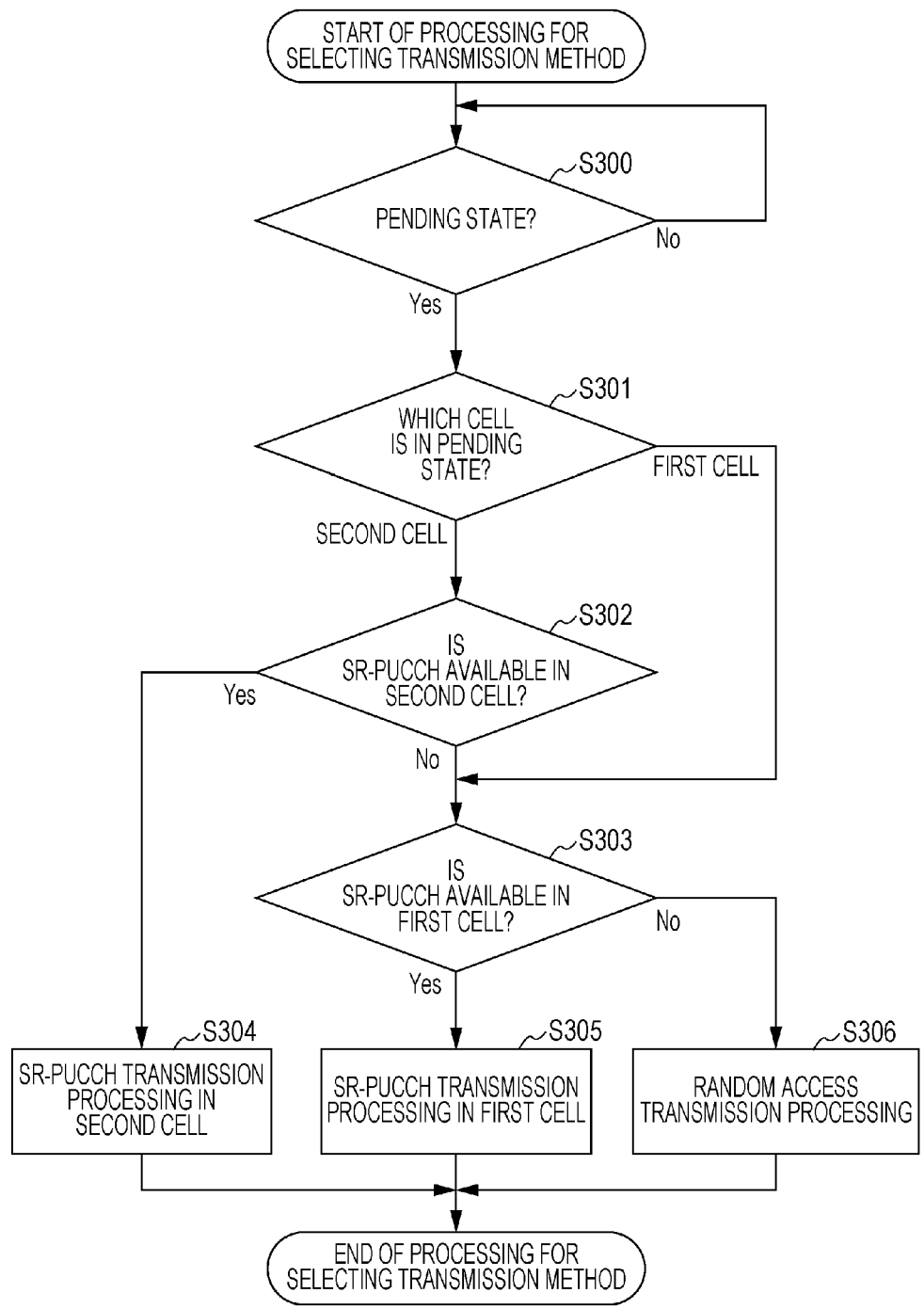
FIG. 8 is a flowchart illustrating one example of processing for selecting a transmission method related to a radio resource request of a terminal apparatus in a third embodiment of the present invention.

FIG. 8 is a flowchart illustrating one example of processing for selecting a transmission method related to a radio resource request of the terminal apparatus 1 in the third embodiment of the present invention. FIG. 8 is carried out in the MAC layer (that is, each block realizing functions of the MAC layer). Meanings of a first cell and a second cell are same as those of FIG. 4.

Here, since each processing of FIG. 8 performed by the terminal apparatus 1 other than processing of step S301 is the same as that of FIG. 7 described in the second embodiment, only step S301 of FIG. 8 will be described below. However, it is set that the terminal apparatus 1 operates other processing description of which is omitted in FIG. 8 based on the corresponding description of FIG. 7.

When the SR state is the pending state (Yes at step S300), the terminal apparatus 1 performs processing of step S301. At step S301, the terminal apparatus 1 performs different processing depending on whether the pending state judged (determined, decided) at step S300 is of the first cell or the second cell. That is, when it is judged (determined, decided) that the SR state of the second cell is the pending state at step S301, the terminal apparatus 1 operates so as to perform processing of step S302. On the other hand, when it is judged (determined, decided) that the SR state of the first cell is the pending state at step S301, the terminal apparatus 1 operates so as to perform processing of step S303.

The terminal apparatus 1 of the third embodiment has a function of managing the SR states in each of the first cell and the second cell in order to support the operation of step S301. That is, the terminal apparatus 1 has the function of managing each of a plurality of SR states corresponding to the number of cell groups configured from the base station apparatus 2. This function is desired to be realized in the MAC layer of the terminal apparatus 1.

The terminal apparatus 1 carries out any of SR-PUCCH transmission processing in the second cell (step S304), SR-PUCCH transmission processing in the first cell (step S305), and random access transmission processing in the first cell (step S306) according to whether the SR-PUCCH is available in the second cell (step S302) and whether the SR-PUCCH is available in the first cell (step S303) after step S301.

Moreover, when the SR-PUCCH is available in the second cell of a plurality of cell groups (that is, secondary cell groups), the terminal apparatus 1 performs SR-PUCCH transmission processing in the second cell corresponding to the cell group in which the SR state becomes pending.

With such a configuration, the terminal apparatus 1 is able to transmit a physical uplink control channel corresponding to a plurality of cells or a cell group, and make a radio resource request appropriately to the base station apparatus 2. That is, the terminal apparatus 1 is able to perform a communication method for appropriately selecting, based on configuration information of the terminal apparatus 1 and a cell (cell group) corresponding to the uplink buffer which requires the radio resource request, a radio resource request using any of a physical uplink control channel corresponding to a certain first cell group, a physical random access channel corresponding to a certain first cell group and a physical uplink control channel corresponding to a certain second cell group.

The terminal apparatus 1 of the present embodiment becomes possible to carry out efficient procedure of transmitting uplink control information based on configuration information notified to the terminal apparatus 1 and a cell (cell group) corresponding to an uplink buffer which requires a radio resource request. Moreover, the base station apparatus 2 of the present embodiment becomes possible to cause the terminal apparatus 1 to cope with a network in which a physical uplink control channel is configured to a plurality of cells by notifying appropriate control information of an uplink for selecting the procedure of transmitting the uplink control information.

According to the third embodiment, since the terminal apparatus 1 is able to select and transmit an appropriate transmission processing method of a radio resource request based on cells configured from the base station apparatus 2, control information of the uplink, and a cell (cell group) corresponding to the uplink buffer which requires a radio resource request, the transmission procedure is made more efficient. Moreover, since the base station apparatus 2 receives the radio resource request transmitted based on the efficient transmission procedure in the terminal apparatus 1, it is possible to provide the terminal apparatus 1 with appropriate scheduling using a plurality of cells. Therefore, it is possible to improve throughput for the terminal apparatus 1.

Note that, the embodiments described above are only exemplifications, and are able to be realized by using various modified examples and substitution examples. For example, the present uplink transmission scheme is able to be applied to communication systems of both an FDD (frequency division duplex) scheme and a TDD (time division duplex) scheme. Moreover, as measurement values of the downlink, the path loss or the other measurement values (SIR, SINR, RSRP, RSRQ, RSSI and BLER) may be used alternatively, and a plurality of these measurement values are also able to be used in combination. In addition, respective parameter names shown in the embodiments are given for convenience of description, and even when parameter names in practical use and parameter names of the embodiments of the present invention are different, there is no influence on the gist of the invention which is claimed by the embodiments of the present invention.

Moreover, the terminal apparatus 1 is not limited to a terminal which moves, and the embodiments of the present invention may be realized by mounting functions of the terminal apparatus 1 in a fixed terminal or the like. The terminal apparatus is also referred to as a user terminal, a mobile station apparatus, a communication terminal, a moving body, a terminal, UE (User Equipment), or an MS (Mobile Station). The base station apparatus is also referred to as a radio base station apparatus, a base station, a radio base station, a fixed station, NB (Node-B), eNB (evolved Node-B), a BTS (Base Transceiver Station), or a BS (Base Station).

Note that, the base station apparatus 2 which is prescribed by 3GPP is referred to as NodeB, and the base station apparatus 2 in EUTRA and advanced EUTRA is referred to as eNodeB. Note that, the terminal apparatus 1 in EUTRA and Advanced EUTRA, which is prescribed by 3GPP, is referred to as UE (User Equipment).

Further, though description has been given for the terminal apparatus 1 and the base station apparatus 2 of the embodiments by using functional block diagrams for convenience of description, steps of a method or algorithm for realizing functions or a part of these functions of each portion of the terminal apparatus 1 and the base station apparatus 2 may be embodied directly in hardware, in a software module executed by a processor, or in a combination of these two. If being implemented in software, the function may be held or transmitted as one or more commands or codes on a computer readable medium. The computer readable media include both communication media and computer recording media including any medium that facilitates transferring a computer program from one place to another place.

Then, control of the terminal apparatus 1 and the base station apparatus 2 may be performed by recording one or more commands or codes in a computer readable recording medium and causing a computer system to read the one or more commands or codes recorded in this recording medium for execution. Note that, the "computer system" here is set to include an OS and hardware, such as peripheral equipment.

Operation described in each embodiment of the present invention may be realized by a program. The program which is operated at the terminal apparatus 1 and the base station apparatus 2 related to each embodiment of the present invention is a program which controls a CPU or the like so as to realize the functions of the aforementioned embodiments related to each embodiment of the present invention (program causing a computer to function). In addition, information handled in these apparatuses is temporarily accumulated in a RAM during processing thereof, and then stored in various ROM or HDD to be read out by the CPU as necessary, for correction and writing. In addition, although the functions of the embodiments described above are realized by executing the program, the functions of each embodiment of the present invention are also realized in some cases by performing processing based on instructions of the program in conjunction with an operating system, other application programs or the like.

Moreover, the "computer readable recording medium" refers to a portable medium including a semiconductor medium (for example, such as RAM or a nonvolatile memory card), an optical recording medium (for example, such as a DVD, an MO, an MD, a CD or a BD), a magnetic recording medium (for example, a magnetic tape or a flexible disk), or a storage apparatus including a disc unit embedded in a computer system. Further, the "computer readable recording medium" includes one which dynamically holds a program for a short time, such as a communication line in a case where the program is transmitted through a network such as the Internet or a communication line such as a telephone line, and one which holds a program for a fixed time, such as a volatile memory inside a computer system serving as a server or a client in the above case.

Moreover, the aforementioned program may be one for realizing a part of the functions described above, and further may be one capable of realizing the functions described above by being combined with a program which has been already recorded in a computer system.

Moreover, each functional block or various features of the terminal apparatus 1 and the base station apparatus 2 used in each of the aforementioned embodiments may be implemented or executed by a general-purpose processor, a digital signal processor (DSP), an application specific or general application integrated circuit (ASIC), a field programmable gate array signal (FPGA), or other programmable logic devices, discrete gates or transistor logic, a discrete hardware component, which is designed to execute the functions described in the present specification, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit.

The processor may be implemented also as a combination with a computing device. For example, a DSP and a microprocessor, a plurality of microprocessors, one or more microprocessors connected to a DSP core, or other such configurations are combined.

As above, the embodiments of the present invention have been described in detail based on particular specific examples, however, it is clear that a gist of each embodiment and a scope of Claims of the present invention are not limited to these particular specific examples. That is, the description in the present specification aims to give exemplary description and does not give any limitation to each embodiment of the present invention.

INDUSTRIAL APPLICABILITY

The present invention is applicable to various apparatuses having a communication function such as not only a portable mobile phone, a personal computer, a tablet computer or a movable apparatus, but also stationary or unmovable electronic equipment which is installed indoors and outdoors such as, for example, AV equipment, kitchen equipment, cleaning/washing machine, air conditioning equipment, office equipment, automatic vending machine, other domestic equipment, measurement equipment, an in-vehicle apparatus, and further, wearable equipment which is wearable, or healthcare equipment.

DESCRIPTION OF REFERENCE NUMERALS 1 terminal apparatus
2, 2-1, 2-2 base station apparatus
101, 201 reception portion
102, 202 demodulation portion
103, 203 decoding portion
104 measurement processing portion
105, 204 control portion
106 uplink buffer control portion
107, 205 coding portion
108, 206 modulation portion
109, 207 transmission portion
110 uplink radio resource request control portion
111 random access control portion
112, 208 higher layer portion
209 network signal transmission and reception portion
300 MME
400 SGW

The invention claimed is:

1. A terminal apparatus that communicates with a base station apparatus, the terminal apparatus comprising:
a processor; and
a memory associated with the processor; wherein
the processor receives, from the base station apparatus, a first uplink control channel configuration used for a radio resource request corresponding to a first cell group and a second uplink control channel configuration used for a radio resource request corresponding to a second cell group, the first cell group including one primary cell, the second cell group not including the primary cell, a cell for the first cell group or the second cell group being configured based on information received from the base station apparatus; and
the processor transmits:
a first uplink control channel on a cell of the first cell group in a case of performing the radio resource request with respect to the first cell group, and
a second uplink control channel on a cell of the second cell group in a case of performing the radio resource request with respect to the second cell group.

2. The terminal apparatus according to claim 1, wherein
the radio resource request corresponding to the first cell group or the second cell group is considered as a pending state based on an uplink buffer, and
the processor transmits the uplink control channel for the cell group corresponding to the radio resource request being in the pending state.

3. The terminal apparatus according to claim 1, wherein
the maximum number of times of transmission of the uplink control channel is configured to each of the first cell group and the second cell group individually, and
the terminal apparatus is configured to release the uplink control channel configuration of the second cell group in a case where the number of times of transmission of the second uplink control channel reaches the maximum number of times of transmission.

4. A base station apparatus that communicates with a terminal apparatus, the base station apparatus comprising:
a processor; and
a memory associated with the processor; wherein
the processor transmits:
to the terminal apparatus, information for configuring a cell for (i) a first cell group including one primary cell or (ii) a second cell group not including the primary cell; and
to the terminal apparatus, a first uplink control channel configuration used for a radio resource request corresponding to the first cell group and a second uplink control channel configuration used for a radio resource request corresponding to the second cell group; and
the processor causes the terminal apparatus to transmit a first uplink control channel on a cell of the first cell group in a case where the radio resource request with respect to the first cell group is performed, and to transmit a second uplink control channel on a cell of the second cell group in a case where the radio resource request with respect to the second cell group is performed.

5. The base station apparatus according to claim 4, wherein
the processor notifies the terminal apparatus of uplink control channel configuration information, which is configured to the primary cell and one cell in the second cell group, and
the uplink control channel configuration information is used for the radio resource request.

6. A communication method of a terminal apparatus that communicates, with a base station apparatus, the method comprising:
configuring a cell for (i) a first cell group including one primary cell or (ii) a second cell group not including the primary cell, the configuring being based on information received from the base station apparatus;
receiving, from the base station apparatus, uplink control channel configuration used for a radio resource request corresponding to the first cell group and a second uplink control channel configuration used for a radio resource request corresponding to the second cell group;
transmitting a first uplink control channel on a cell of the first cell group in a case of performing the radio resource request with respect to the first cell group; and
transmitting a second uplink control channel on a cell of the second cell group in a case of performing the radio resource request with respect to the second cell group.

7. A communication method of a base station apparatus that communicates with a terminal apparatus, the method comprising at least:
transmitting, to the terminal apparatus, information for configuring a cell for (i) a first cell group including one primary cell or (ii) a second cell group not including the primary cell;
transmitting, to the terminal apparatus, a first uplink control channel configuration used for a radio resource request corresponding to the first cell group and a second uplink control channel configuration used for a radio resource request corresponding to the second cell group; and
causing the terminal apparatus to transmit a first uplink control channel on a cell of the first cell group in a case where the radio resource request with respect to the first cell group is performed, and to transmit a second uplink control channel on a cell of the second cell group in a case where the radio resource request with respect to the second cell group is performed.

* * * * *